(12) United States Patent
Sandor et al.

(10) Patent No.: US 7,343,341 B2
(45) Date of Patent: Mar. 11, 2008

(54) SYSTEMS AND METHODS FOR TRADING EMISSION REDUCTIONS

(75) Inventors: Richard Sandor, Chicago, IL (US); Michael Walsh, Downers Grove, IL (US); Murali Kanakasabai, Chicago, IL (US)

(73) Assignee: Chicago Climate Exchange, Inc., Chicago, IL (US)

( * ) Notice: Subject to any disclaimer, the term of this patent is extended or adjusted under 35 U.S.C. 154(b) by 0 days.

(21) Appl. No.: 11/034,752

(22) Filed: Jan. 14, 2005

(65) Prior Publication Data

US 2005/0246190 A1    Nov. 3, 2005

Related U.S. Application Data

(63) Continuation-in-part of application No. 10/623,134, filed on Jul. 18, 2003.

(60) Provisional application No. 60/537,344, filed on Jan. 15, 2004, provisional application No. 60/397,401, filed on Jul. 20, 2002.

(51) Int. Cl.
  *G06Q 40/00* (2006.01)
  *G06Q 99/00* (2006.01)

(52) U.S. Cl. ....................... 705/37; 705/199

(58) Field of Classification Search ............ 705/1, 705/7, 8, 10, 11, 26, 28, 36 R, 37, 39, 27
See application file for complete search history.

(56) References Cited

U.S. PATENT DOCUMENTS

| | | | |
|---|---|---|---|
| 4,677,552 A | 6/1987 | Sibley, Jr. ............... 364/408 |
| 5,532,928 A | 7/1996 | Stanczyk et al. ......... 364/406 |
| 5,621,654 A | 4/1997 | Cohen et al. ............ 364/493 |
| 5,664,112 A * | 9/1997 | Sturgeon et al. ......... 705/28 |
| 5,726,884 A | 3/1998 | Sturgeon et al. ......... 395/209 |
| 5,794,212 A | 8/1998 | Mistr, Jr. ................ 705/26 |
| 5,887,547 A * | 3/1999 | Caveny et al. ........... 119/174 |
| 5,975,020 A * | 11/1999 | Caveny et al. ........... 119/174 |
| 6,067,549 A | 5/2000 | Smalley et al. .......... 707/104 |
| 6,112,188 A | 8/2000 | Hartnett ................. 705/35 |
| 6,115,672 A * | 9/2000 | Caveny et al. ........... 702/19 |
| 6,115,698 A | 9/2000 | Tuck et al. ............. 705/37 |
| 6,256,640 B1 | 7/2001 | Smalley et al. .......... 707/104 |
| 6,341,287 B1 * | 1/2002 | Sziklai et al. ........... 707/102 |

(Continued)

FOREIGN PATENT DOCUMENTS

JP    02002181304 A  *  6/2002

(Continued)

OTHER PUBLICATIONS

Sandor, R., "Implementation Issues: Market Architecture and The Tradeable Instrument," Chapter IX, pp. 151-166, United Nations Conference on Trade and Development, May 1992.

(Continued)

*Primary Examiner*—Igor N. Borissov
(74) *Attorney, Agent, or Firm*—Winston & Strawn LLP

(57) ABSTRACT

Systems and methods for facilitating trading of emission allowances and offsets among participants are described. In some embodiments, methods of facilitating such trading include establishing an emissions reduction schedule for certain participants based on emissions information provided by those participants and determining debits or credits for each participant in order to achieve the reduction schedule.

20 Claims, 19 Drawing Sheets

U.S. PATENT DOCUMENTS

| | | | |
|---|---|---|---|
| 6,560,580 B1 | 5/2003 | Fraser et al. .................. | 705/37 |
| 6,601,033 B1* | 7/2003 | Sowinski ....................... | 705/1 |
| 6,780,220 B2* | 8/2004 | Milbrath et al. .............. | 75/602 |
| 6,904,336 B2* | 6/2005 | Raines et al. ............... | 700/286 |
| 2001/0032168 A1 | 10/2001 | Adamson et al. ............. | 705/37 |
| 2001/0049651 A1 | 12/2001 | Selleck ......................... | 705/37 |
| 2002/0143693 A1* | 10/2002 | Soestbergen et al. ......... | 705/37 |
| 2002/0188459 A1* | 12/2002 | Erickson ........................ | 705/1 |
| 2003/0055665 A1 | 3/2003 | Fleming ........................ | 705/1 |
| 2003/0085179 A1 | 5/2003 | Kim et al. .................. | 210/739 |
| 2003/0229572 A1 | 12/2003 | Raines et al. ................. | 705/37 |
| 2004/0015454 A1 | 1/2004 | Raines et al. ............... | 705/412 |
| 2004/0039684 A1 | 2/2004 | Sandor ......................... | 705/37 |
| 2004/0143467 A1* | 7/2004 | McAllister et al. ............ | 705/7 |
| 2004/0158478 A1* | 8/2004 | Zimmerman .................... | 705/1 |
| 2004/0230443 A1* | 11/2004 | McMorris et al. ............. | 705/1 |
| 2005/0154669 A1* | 7/2005 | Streetman .................... | 705/38 |

FOREIGN PATENT DOCUMENTS

| | | |
|---|---|---|
| WO | WO 02/37433 | 5/2002 |
| WO | WO 02/37776 | 5/2002 |
| WO | WO 02/077776 | 10/2002 |
| WO | WO 02/086657 | 10/2002 |
| WO | WO 2004/010366 | 1/2004 |

OTHER PUBLICATIONS

Sandor, R., "Statement to The Prague Meeting on Sustainable Development," Jan. 14, 1995.

Sandor, R., "Getting Started with a Pilot: The Rationale for a Limited-Scale Voluntary International Greenhouse Gas Emissions Trading Program," Hearing before The Committee on Energy and Natural Resources United States Senate, One Hundred Fifth Congress, First Session, Sep. 30, 1997 and presentation at The White House Conference on Climate Change, Oct. 6, 1997.

Sandor, R., Statement to The Hearing before The Committee on Energy and Natural Resources of The U.S. Senate, One Hundred Fifth Congress, First Session, The Impacts on a New Climate Treaty on U.S. Labor, Electricity Supply, Manufacturing and The General Economy, Sep. 30, 1997.

Sandor, R., "Trading Gases," Our Planet Magazine, The United Nations Environment Programme Magazine for Environmentally Sustainable Development, vol. 9, No. 6, 1998.

Sandor, R., "Corporate Giants To Aid Design of U.S. Carbon Market," Environmental Finance Magazine, Jun. 2001.

Solomon, B., "Emissions Trading Systems and Environmental Justice," Environment; Washington, 42:8, Oct. 2000, pp. 32-45.

Sandor, R., "SO2 Market Exceeds Expectations," Environmental Finance, p. 11, May 2000.

Kiesling, L., "CO2 Emissions Trading, The Coase Theorem, and Creating New Markets," The Reason Foundation, Oct. 23, 2002.

"The Chicago Climate Exchange: Trading Hot Air," The Economist edition, Oct. 17, 2002.

"Chicago Climate Exchange: Rothschild to Advise CCX on Equity Offering," The Financial Times, Nov. 4, 2002.

Sandor, R. (Chairman & CEO, Environmental Financial Products, LLC), "Statement to the U.S. Senate Environment and Public Works Committee," Mar. 24, 1999 Hearing on Credit for Voluntary Early Actions.

Sandor, R., "Toward an International CO2 Entitlement Spot and Futures Market," Ch. 3.2, pp. 221-236, excerpt from *Market-based Approaches to Environmental Policy: Regulatory Innovations to the Fore*, eds. R.F. Kosobud, et al.

"Designing Options for Implementing an Emissions Trading Regime for Greenhouse Gases in The European Community," Final Report, Feb. 22, 2000.

* cited by examiner

SYSTEMS AND METHODS FOR TRADING EMISSION REDUCTIONS

REFERENCE TO RELATED APPLICATIONS

This application is a continuation-in-part of U.S. patent application Ser. No. 10/623,134, filed on Jul. 18, 2003, pending, which claims the benefit under 35 U.S.C. § 119(e) of U.S. Patent Application No. 60/397,401, filed on Jul. 20, 2002. This application claims the benefit under 35 U.S.C. § 119(e) of U.S. Patent Application No. 60/537,344, filed on Jan. 15, 2004. The contents of all of these applications are explicitly incorporated by reference herein in their entireties.

COPYRIGHT NOTICE

This application includes material that is subject to copyright protection. The copyright owner does not object to the facsimile reproduction of the application by any person as the application appears in the records of the U.S. Patent and Trademark Office, but otherwise reserves all rights in the copyright.

BACKGROUND

The world's environment faces significant threats from anthropogenic or "human-caused" releases of greenhouse gases to the atmosphere. Greenhouse gases, such as water vapor, carbon dioxide, tropospheric ozone, nitrous oxide, and methane, are generally transparent to solar radiation but opaque to longwave radiation, thus preventing longwave radiation energy from leaving the atmosphere. The net effect of greenhouse gases in the atmosphere is a trapping of absorbed radiation and a tendency to warm the planet's surface.

Greenhouse gases can be released, for example, by the release of carbon dioxide during fossil fuel combustion. Thus, automobiles, factories, and other devices that combust fuel release carbon dioxide gases into the atmosphere. However, greenhouse gases can also be released by more natural means. For example, farmers may till farmland such that carbon dioxide from the tilled ground is released into the air. The removal of forest stands, or deforestation, can also result in the release of greenhouse gases.

In general, the rapid increases in the concentration of greenhouse gases in the earth's atmosphere caused by human activity increases the risk of fundamental and costly changes in the earth's climate system. Such risks can include more severe drought/precipitation cycles; longer and more extreme heat waves; spread of tropical diseases; damage to vegetation and agricultural systems; and threats to coastlines and property due to higher sea levels and storm surges.

In the 1980's, the United States implemented an emissions trading system to phase out lead from motor fuel. This effort was followed by a highly successful U.S. Environmental Protection Agency (EPA) sulfur dioxide ($SO_2$) emissions trading program. To reduce acid rain, an overall cap on $SO_2$ emissions was imposed on electric power plants. Utilities that found it expensive to cut sulfur emissions could buy allowances from utilities that make extraordinary cuts at low cost.

The $SO_2$ program has been successful. Emissions were reduced faster than required and costs were far below most forecasts. There has also been steady growth in the trading of allowances, from 700,000 tons in 1995 to approximately 12 million tons in 2001. The $SO_2$ emissions market has now reached a value of approximately $2 billion each year for registered trades.

The environmental and economic success of the U.S. sulfur dioxide allowance trading program to reduce acid rain, as well as other similar markets, provides evidence of the benefits of emissions trading on a large-scale. Emissions trading introduces scarcity by establishing limits on overall emissions, specifying firm-level limits, and allowing those who can cut emissions at low cost to make extra cuts. Companies facing high costs to cut emissions can comply by purchasing tradable emission rights from those who make extra cuts. The market in a property-like instrument—emission allowances—helps assure efficient use of the limited resource (the environment) and yields a price that signals the value society places on use of the environment. That price represents the financial reward paid to those who reduce emissions, and also indicates the value of creating innovative pollution reduction techniques.

Emission allowance trading systems, sometimes referred to as "cap and trade" systems, can be supplemented by project-based "offsets" that reflect reduction of greenhouse gases and/or capture and storage of carbon dioxide. Offsets can be generated by individual initiatives undertaken by entities that are either not significant emission sources, or have emission profiles that are naturally incorporated into the market as offsets. For example, individual farmers can absorb and store carbon dioxide in soils by maintaining cropping practices that use conservation tillage. Conservation tillage involves minimal disturbance of the soil, thus trapping carbon that was transmitted to the soil by growth of plants.

Incorporation of offsets provides industrial emission sources with an additional source of greenhouse gas mitigation, while also providing a funding source for activities, such as conservation tillage, which produce local environmental benefits such as improved water quality.

Many major industrial nations have sought the design of a greenhouse gas emissions trading program that can provide corporations and others an organized, market-based mechanism for cost-effectively reducing global warming gases. This endeavor presents a means for effectively addressing climate change while offering its owners and members a significant commercial opportunity.

While national and sub-national governments have been studying greenhouse gas emissions trading programs, for several years private sector leaders in many countries have financed mitigation projects and conducted trading with informal "carbon credits." A World Bank study reports that this nascent over-the-counter market has included several dozen significant trades. The study found that, in the absence of any regulatory framework, the dollar volume of over-the-counter transactions has already surpassed $200 million. Furthermore, The Economist magazine projects an annual volume of trading ranging from $60 billion to $1 trillion.

Numerous governments have moved beyond planning and are implementing formal greenhouse gas markets, including the U.K., Denmark, and the Netherlands, as well as Massachusetts and New Hampshire. The European Union has established the framework for a carbon dioxide emissions trading system to be employed starting 2005. The European Union Directive establishes an initial phase market in advance of a broader and more comprehensive greenhouse gas emissions trading system among energy and industrial facilities in its member states starting in 2008.

A number of states, provinces, exchanges and multilateral institutions have made detailed preparations for trading. It is in this context, recognition of a serious environmental risk, desire for least-cost responses, increasing regulation worldwide, and demands from stakeholders that the present invention offers solutions to challenges in establishing and operating a greenhouse gas trading exchange.

Examples of barriers to greenhouse gas trading include regulatory uncertainty; lack of a clear, widely-accepted definition of the commodity; lack of standards for monitoring, verification, and trade documentation; lack of standards for eligibility of project-based emission offsets; and lack of organized markets and clear market prices. Other barriers and challenges also exist. These barriers constitute significant transaction costs that impede progress in adoption of greenhouse gas reduction commitments by raising the costs of achieving such commitments.

Thus, there is a need for an improved emissions reduction trading system that allows realization of greenhouse gas reduction objectives at lower transaction costs. Further, there is a need for an organized trading system to promote the reduction of greenhouse gas emissions. Even further, there is a need for a standards-based, organized trading market for greenhouse gases.

SUMMARY

The present invention relates to a method of facilitating trade of emission allowances and offsets among participants, which includes establishing an emission reduction schedule for certain participants based on emissions information provided by those participants and determining debits or credits for each certain participant in order to achieve the reduction schedule. In an exemplary embodiment, the participants include both voluntary greenhouse gas (GHG) emission reducers and environmental benefactors, the certain participants include the voluntary GHG emission reducers and the method further includes conducting trades between the participants. Typically, the voluntary GHG emission reducers include industrial entities, while the environmental benefactors include non-industrial entities, and the voluntary GHG emission reducers obtain at least some of their debits from the environmental benefactors.

The non-industrial entities may include (a) foresters, farmers, or others who prepare land for facilitating prevention of greenhouse gas emissions or for capturing and storing carbon or carbon dioxide, or (b) businesses including law firms, advertising agencies, banks, shopping centers or other businesses that are capable of exerting control over utility or transportation uses in order to reduce or conserve such uses to reduce GHG emissions caused by generation of power or electricity for providing such uses. The environmental benefactors are provided credits for conducting activities that include planting trees; keeping carbon released by plants in the soil; reducing electricity consumption; reducing business travel; removing pollutants from streams, lakes, landfills, or other environmentally unfriendly areas; purchasing environmentally friendly products; or recycling, thus facilitating trading of such credits or allowances by the environmental benefactors with the voluntary GHG emission reducers.

The present invention further relates to a computer-based system for facilitating the trade of emission allowances and offsets among participants, which includes means for establishing an emission reduction schedule for certain participants based on emissions information provided by those participants and means for determining debits or credits for each certain participant in order to achieve the reduction schedule. Preferably, the participants include voluntary GHG emission reducers and environmental benefactors, and the certain participants include the voluntary GHG emission reducers. The system also preferably further includes (a) debits or credits representing emission reduction amounts based on the emissions information or activities of environmental benefactors, and (b) means for conducting trades of the debits or credits between the participants to enable each certain participant to achieve its reduction schedule.

Systems and methods for computing greenhouse gas (GHG) emission or emission reduction equivalents based on energy consumption or conservation activities are also disclosed.

In some embodiments, methods for computing GHG emission or emission reduction equivalents include providing activity data based on an energy consumption or conservation activity and associated with selectable activity units. A factor for converting the activity data to one of GHG emission or GHG emission reduction equivalents is applied to compute the GHG emissions or emission reduction equivalents. The factor is based on the type of energy activity and the selected activity unit. The equivalents conform to standard values that facilitate trading between participants. The factor can be based at least in part upon a location feature that is related to the geographic location of the energy activities and that is associated with selectable geographic locations.

In some embodiments, the participants include voluntary emission reducers and environmental benefactors, and the methods further include trading GHG emission or emission reduction equivalents between the participants so that the voluntary emission reducers can reduce GHG emissions.

The energy consumption or conservation activities typically include one or more of power generation activities, transportation activities, and non-transportation activities. Each transportation activity is related to an energy source consumed during transportation and is associated with selectable activity units that include one or more of: units of transportation fuel consumed during transportation and units of distance traveled during transportation, optionally modified by fuel efficiency values. Each non-transportation energy activity is related to an energy source consumed independent of transportation and is associated with selectable activity units that include one or more of: units of energy consumed during production of a product, units of a feedstock consumed during production of a product, units of a product produced, units of a product consumed, units of energy consumed during operation of an office facility, and units of office space occupied by an office facility.

In some embodiments, a database of factors is provided, in which each factor is associated with a type of energy activity, a geographic location, and an activity unit. The factor is determined by querying the database to determine whether it includes a factor that is associated with the type of energy activity and the selected activity unit.

The factors generally include emissions factors and conservation factors. Each emission factor is usually associated with a type of energy source consumed and an activity unit, while each conservation factor is usually associated with an energy conservation activity, a geographic location, and an activity unit.

Systems and methods for reducing pollution by creating a demand for a tradable GHG emission or emission reduction equivalents are also disclosed.

In some embodiments, methods for reducing pollution include computing GHG emission equivalents for a first participant based on the previously described methods, and enabling the first participant to acquire GHG emission reduction equivalents in an amount that is at least equivalent to the computed GHG emission equivalents so as to reduce pollution.

The methods further include computing GHG emission reduction equivalents for a second participant by providing activity data based on an energy conservation activity of the second participant and associated with selectable activity units. A factor for converting the activity data to GHG emission reduction equivalents is applied to compute the GHG emission reduction equivalents of the second participant. The factor is typically based on the type of energy activity and the selected activity unit. When the first participant is a voluntary emission reducer and the second participant is an environmental benefactor, the methods can further include trading GHG emission or emission reduction equivalents between the participants so that the voluntary emission reducers can reduce GHG emissions.

Systems and methods for administering a market for trading GHG emission or emission reduction equivalents are also disclosed.

In some embodiments, computer-implemented methods for administering such a market include receiving a request from a participant to trade on the market. In reply, the participant is requested to provide information on amounts of GHG emission or emission reduction equivalents to be traded, and the participant is registered to trade the GHG emission or emission reduction equivalents on the market.

Activity data can be received from the participant, in which the activity data is based on an energy consumption or conservation activity and associated with selectable activity units. A factor for converting the activity data to one of GHG emission or GHG emission reduction equivalents can be applied, in which the factor is based on the type of energy activity and the selected activity unit to compute the GHG emissions or emission reduction equivalents to confirm whether the participant's information on amounts of GHG emission or emission reduction equivalents to be traded is accurate.

DETAILED DESCRIPTION OF THE PREFERRED EMBODIMENTS

Figure 1:
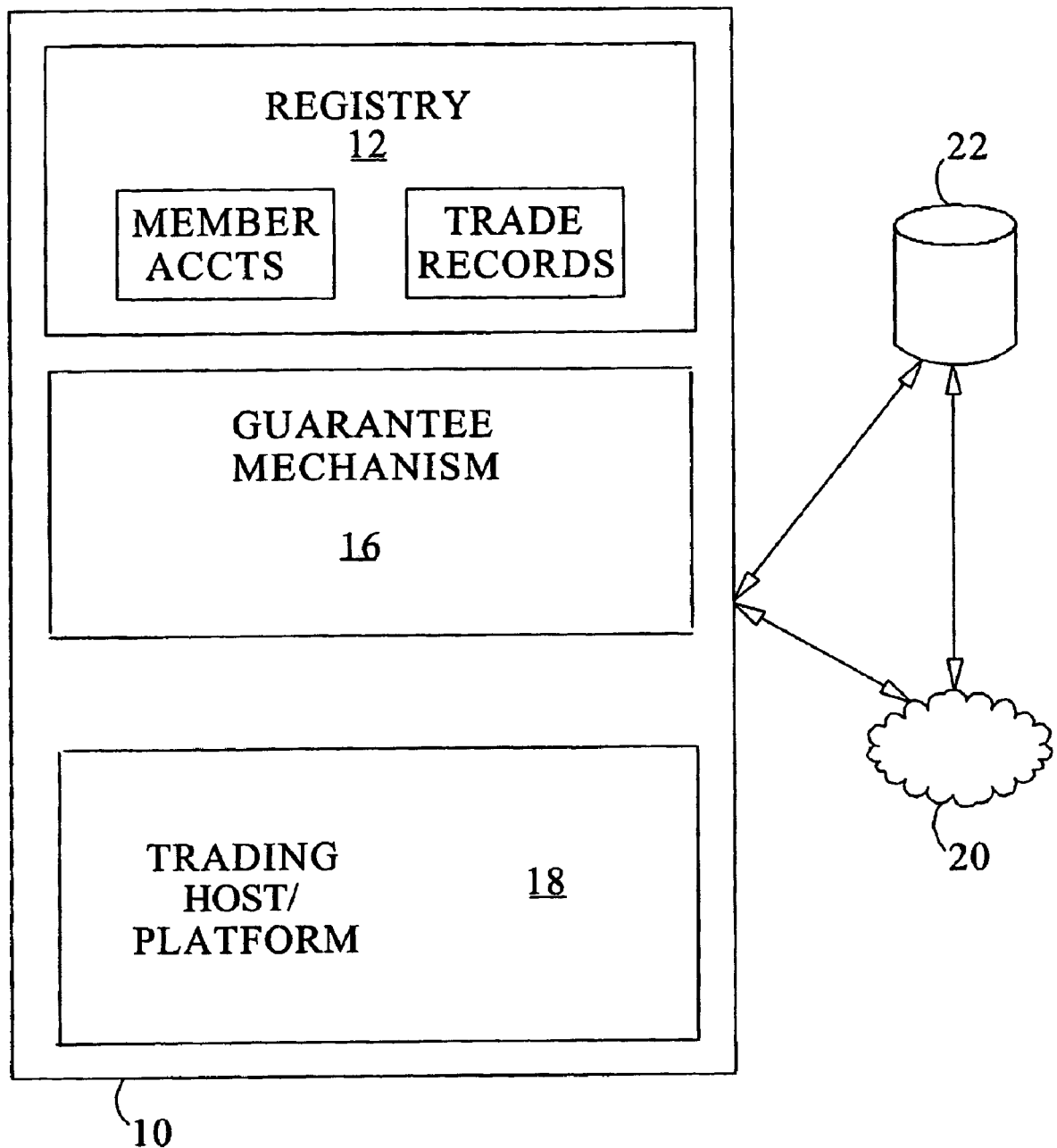
FIG. 1 is a block diagram of an emissions reduction trading system in accordance with an exemplary embodiment of the present invention.

Illustrative embodiments will now be described to provide an overall understanding of the disclosed systems and methods. One or more examples of the illustrative embodiments are shown in the drawings. Those of ordinary skill in the art will understand that the disclosed systems and methods can be adapted and modified to provide systems and methods for other applications, and that other additions and modifications can be made to the disclosed systems and methods without departing from the scope of the present disclosure. For example, features of the illustrative embodiments can be combined, separated, interchanged, and/or rearranged to generate other embodiments. Such modifications and variations are intended to be included within the scope of the present disclosure.

Turning now to the figures that illustrate exemplary embodiments of the invention, FIG. 1 illustrates a diagrammatic representation of an emissions reduction and trading system 10. The system 10 can include a registry 12, a guarantee mechanism 16, and a trading host or platform 18. The system 10 can be coupled to a network 20, such as the Internet or any other public or private connections of computing devices. The system 10 can be communicatively coupled to an emissions database 22 either directly or via the network 20.

The registry 12 serves as the official record of emission allowance and offset holdings of each participant in the commodity market managed by the system 10. Trades become officially acknowledged for compliance purposes only when they are transferred across accounts in the registry 12. The holdings of the registry 12 can be Carbon Financial Instruments (CFIs), such as, exchange allowances (XAs), exchange emission offsets (XOs) generated by mitigation projects, and exchange early action credits (XEs). Each instrument represents one hundred metric tons of $CO_2$ and is preferably designated with a specific annual vintage. Each instrument is recognized as equivalent when surrendered for compliance (subject to certain constraints described below). CFIs may be used in compliance in their designated vintage year or in later years. These equivalents facilitate standardized trades.

In an exemplary embodiment, the registry 12 is designed to have secure Internet access by participants to their own accounts. The registry 12 may be configured to provide access of accounts by the public, but this access would be on a view-only basis. Preferably, the registry 12 is configured with the ability to interface with registries in other greenhouse gas markets. The registry 12 is linked to the trading platform 18 and financial guarantee mechanism 16. The combination of these three components provides a clearinghouse system.

The guarantee mechanism 16 enhances market performance in several ways. The guarantee mechanism 16 ensures that those who conduct sales of CFIs on the trading platform 18 receive next-day payment even if the buyer fails to execute the payment process. This mechanism allows for anonymous trading by eliminating the need to address the credit worthiness of buyers. Non-payment risk is eliminated, thus removing a transaction cost. This feature allows the participation in trading by liquidity providers (including "market makers"), who can stand ready to promptly buy and sell. The presence of standing buyers and sellers increases trading activity, which improves the economic efficiency of the price discovery process. In addition, the ability to trade anonymously allows members to post bids and offers and execute trades without revealing their trading strategies. The guarantee mechanism 16, eliminates the risk that a buyer may fail to make payment.

Upon enrollment as an exchange member, the member is allocated a time stream of original issue allowances that are designated with yearly vintages. Regardless of the method of trading employed, all deliveries of exchange allowances (XAs) and exchange offsets (XOs) occur by having the transferer instruct the registry 12 to move allowances of offsets from its account to the account of the transferee. Subsequent to year-end, the emission source must transfer a quantity of appropriate vintage allowances or offsets equal to its total emissions during the prior year to the retirement account. Subsequent to the end of a compliance year, each exchange member must designate for retirement a quantity of tradable exchange CFIs equal to total emissions of that participant during the compliance year.

The trading platform 18 is an electronic mechanism for hosting market trading. The trading platform 18 provides participants with a central location that facilitates trading, and publicly reveals price information. The trading platform 18 reduces the cost of locating trading counter parties and finalizing trades, an important benefit in a new market. The trading platform 18 may also be used as the platform for conducting the periodic auctions.

Figure 2:
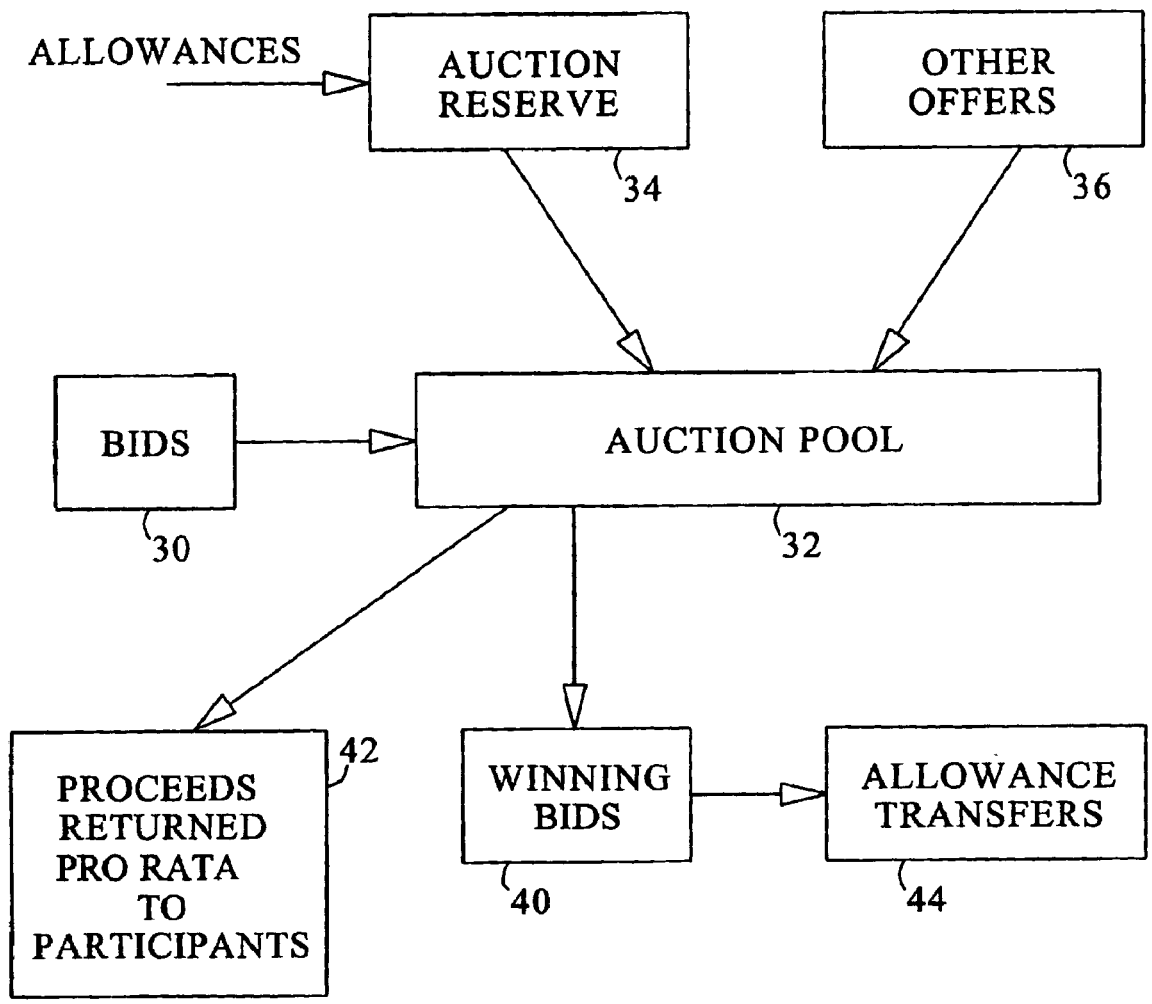
FIG. 2 is a diagrammatic representation of auction functionality within the system of FIG. 1 in accordance with an exemplary embodiment.

FIG. 2 illustrates an exemplary annual auction performed using system 10 described with reference to FIG. 1. Alternatively, the auction can be held intermittently throughout a year. In an exemplary embodiment, the auction operates by providing bids 30 and offers for allowances to an auction pool 32. The auction pool 32 can receive allowances from an auction reserve 34 and other offers 36. The auction reserve 34 includes exchange allowances (e.g., the XAs). Auction results include public price information 38, winning bids 40, and proceeds returned pro data to participants 42. Winning bids 40 result in allowance transfers 44 between accounts in the registry 12 described with reference to FIG. 1.

Advantageously, auctions of greenhouse gas emission allowances provide an orderly mechanism for assisting the market. By publicly revealing prices, the auctions provide critical information to participants. Prices help participants formulate reasonable private trading terms and, importantly, provide signals indicating which internal greenhouse gas mitigation actions are economically logical and which actions are best performed by other participants who face lower mitigation costs.

The system 10 preferably conducts periodic auctions of exchange allowances (XAs) (possibly including exchange emission offsets (XOs) for the purpose of revealing market prices, encouraging trade, and expanding market participation. In an exemplary embodiment, a single-clearing price auction is performed. Alternatively, a discriminating price auction is used. A discriminating price method is used in the Chicago Board of Trade auctions for sulfur dioxide emission allowances. By way of example, a single clearing price auction is understood to be an auction where all buyers pay the lowest price of all accepted bids. In contrast, a discriminating price auction is understood to be an auction where the successful buyers pay the price they bid regardless of what other accepted bid prices are. As such, it is possible to have different accepted prices in the same auction.

Figure 3:
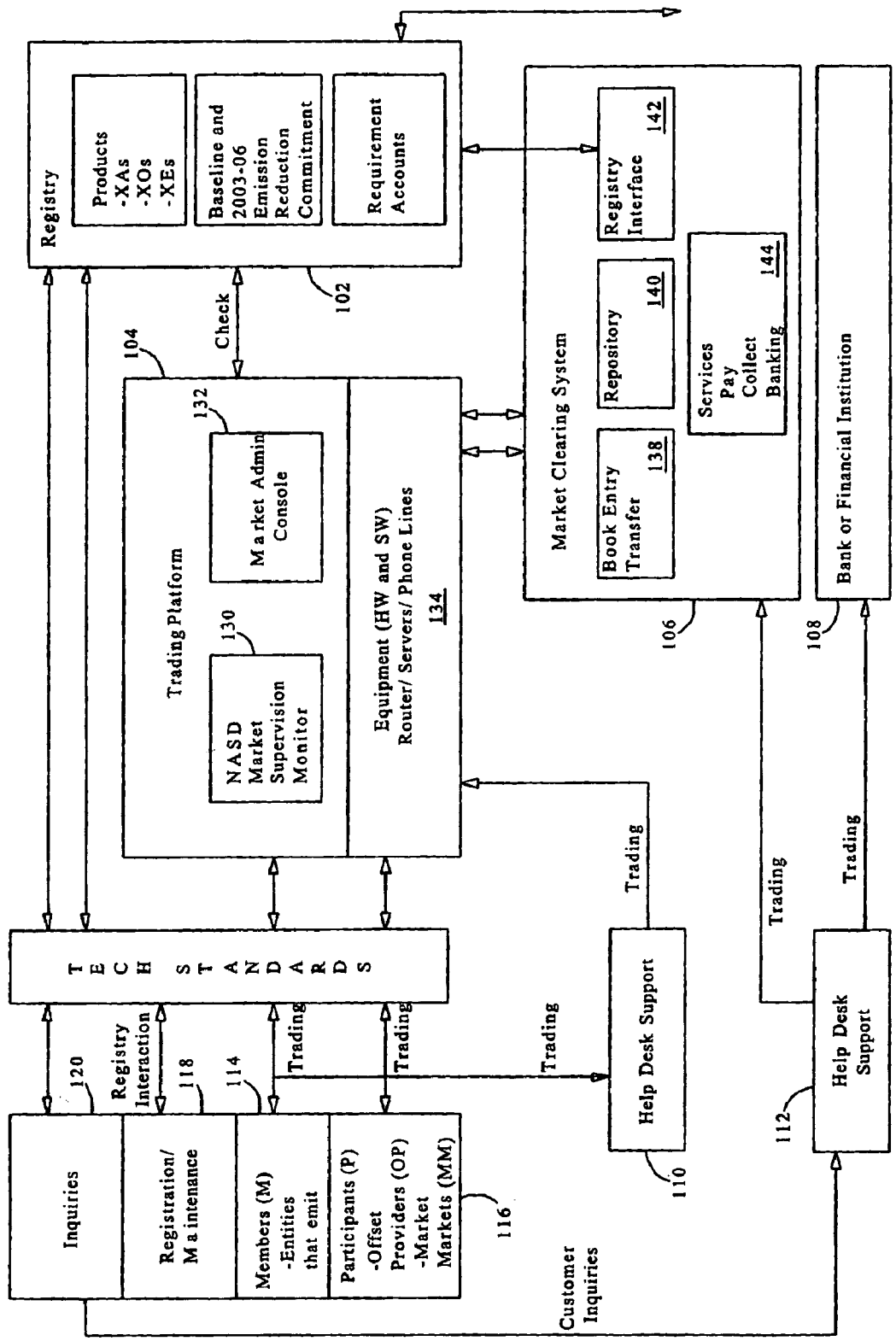
FIG. 3 is a block diagram of an emissions reduction and trading system in accordance with another exemplary embodiment.

FIG. 3 illustrates an emissions reduction and trading system 100. The system 100 can include a registry 102, a trading platform 104, a clearing component 106, a financial institution 108, a help desk 110, and a help desk support component 112. In general, members 114 and/or participants 116 interact with the trading platform 104 to engage in buying and selling allowances and offsets. For registration/maintenance 118 and general inquiries 120, the members 114 and/or participants 116 interact directly with the registry 102. In either case, communication is done by way of technology standards 122. The technology standards 122 can include internet protocol standards and other technology-specific standards that facilitate communication by members 114 and/or participants 116.

The registry 102 can include information regarding system products, such as, XAs, XOs, and XEs, as well as information regarding baseline and emission reduction commitments. The registry 102 can be implemented using a database and computer software. The registry 102 can also include information on retirement accounts for allowances and offsets and early action credits based on activities prior to establishment of the system.

The trading platform 104 provides members 114 and participants 116 with a structure that enables the trading of emission allowances and offsets. The trading platform 104 can be implemented as a software program providing a user interface that enables the execution of various functions. The trading platform 104 can include a market supervision monitor 130, a market administration console 132, and equipment 134. The equipment 134 can include hardware and/or software, such as, routers, servers, phone lines, and the like. The market administration console 132 allows the exchange to manage, intervene, and control accounts and make adjustments to accounts (e.g., where member sells an emission source). The market supervision monitor 130 facilitates the oversight of trading done using the trading platform 104 for adherence to system rules.

The trading platform 104 is coupled to the registry 102 to obtain and communicate information, such as, account information and trading records. The trading platform 104 also interacts with the clearing component 106 in the carrying out of trades performed by members 114 and participants 116 on the trading platform 104. The clearing component 106 can include a book entry transfer 138 that constitutes the official mechanism by which delivery of tradable CFIs occurs, a repository 140, a registry interface 142, and a collection component 144. The financial institution 108 provide for settlement of trades and may provide a mechanism by which financial performance is guaranteed.

The help desk 110 provides trading support for members 114 and participants 116 for trades using the trading platform 104. The help desk support component 112 assists in customer inquiries that are made directly to the system without going through the trading platform 104, which may be provided and maintained by a third party.

The market (as embodied in system 10 or system 100) has been designed with a view to commodities CFIs used in the trading of CFIs. Uniform and fully fusible CFIs (e.g., exchange allowances, exchange offsets, and exchange early action credits) allow for easy transfer and flexibility among participants. Uniformity reduces transaction costs, increases predictability and enhances market liquidity. Such features are a few of the improvements relative to the heterogeneous and high transaction costs associated with practices currently used in the informal market for greenhouse gas emission reductions.

Each member of the market managed by the system 10 (described with reference to FIG. 1) or the system 100 (described with reference to FIG. 3) (hereinafter collectively referred to as the "market") has an emission baseline, which can be the average of its emissions during certain previous years such as 1998 through 2001.

An emissions baseline preferably reflects a detailed assessment of patterns of industrial activity and practical considerations, such as data availability. Emissions baselines can be adjusted to reflect acquisition or disposition of facilities. A reference emission level is preferably established to be able to obtain emissions data, reflect variations in economic cycles, and perform operations. An emission reduction schedule can be defined from the reference emission level.

Figure 4:
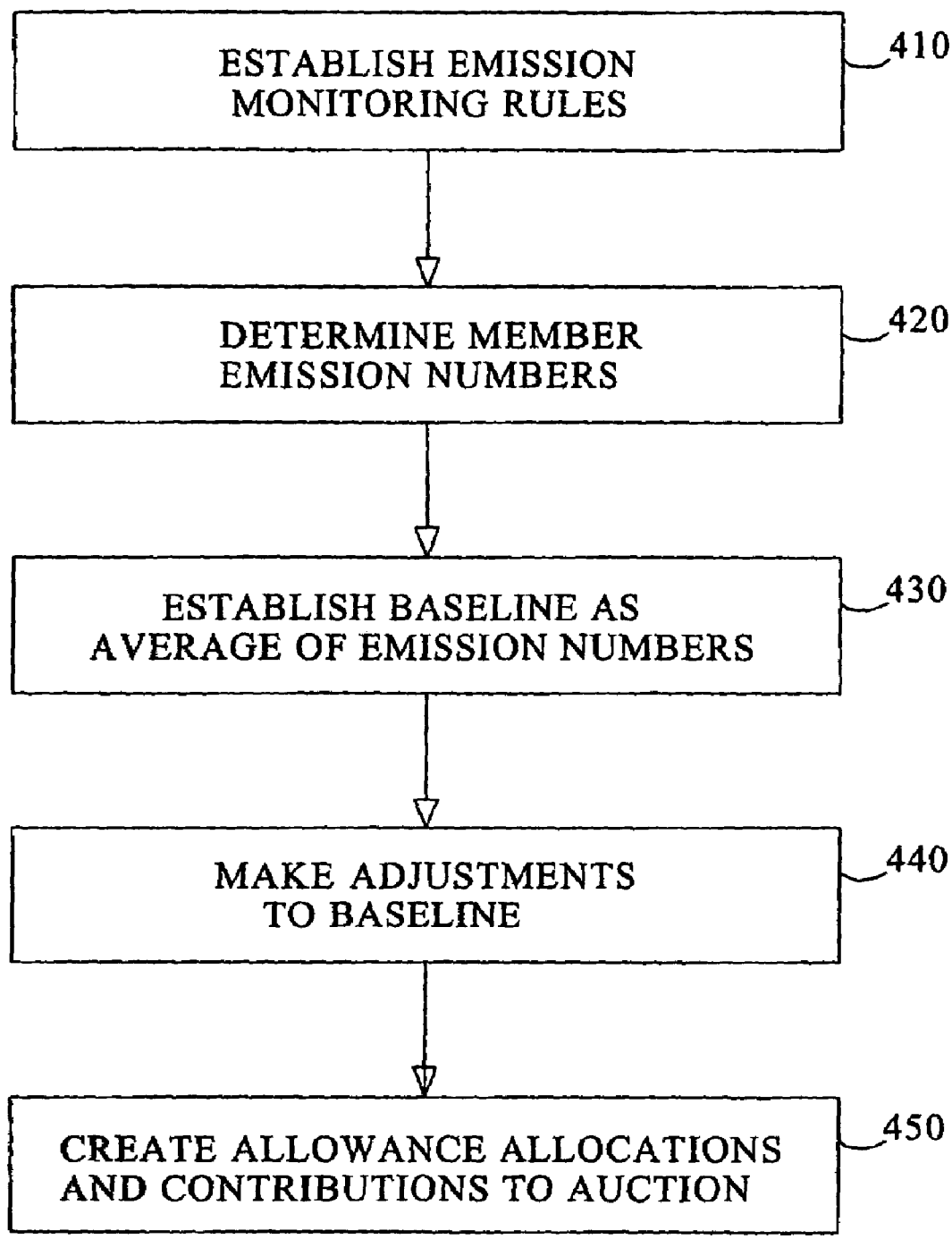
FIG. 4 is a flow diagram depicting exemplary operations performed in the creation of baselines and allowance allocations.

FIG. 4 illustrates operations performed in the creation of baselines and allowance allocations in the market. Additional, fewer, or different operations may be performed, depending on the embodiment. In an exemplary embodiment, an operation 410 is performed in which emission monitoring rules are established. Emission monitoring rules can relate to included facilities, included gases, and/or excluded gases. These rules designate what activities count toward emissions.

In an operation 420, member emission numbers are determined using the emission monitoring rules. In some embodiments, the member emission numbers are computed based on the schemes described with respect to FIGS. 15-17. Emission numbers can be submitted to the market by members or obtained electronically over a network from a database. Emission monitoring rules are applied such that the member emission numbers are accurate for the creation of a baseline. Preferably, the definition of the baseline includes rules governing inclusion of facilities and specifications for defining emissions "ownership" at jointly-owned facilities, and rules for addressing gaps in the baseline period emissions data. Once the emission numbers are obtained, member baselines are established in an operation 430. The baseline can be an average of emission numbers over a certain time period, such as four years.

Adjustments can be made to the baseline in an operation 440. Baseline adjustments can be upward, for example, when emitting facilities are acquired by the member. Similarly, baseline adjustments can be downward, for example, when a member disposes of an emitting facility.

Having established a baseline, an operation 450 can be performed to create allowance allocations and contributions to the auction. An emission reduction schedule created by the market is applied to create an emission schedule for each member. Preferably, the emission reduction schedule utilizes a known rule that is common among all participants. By way of example, the schedule can call for reductions of 1%, 2%, 3% and 4% below baseline emission levels during, e.g., years 2003, 2004, 2005 and 2006 respectively. Members annually surrender a quantity of CFIs (e.g., exchange allowances, exchange emission offsets, when applicable, exchange early action credits) equal to their yearly emissions. After their yearly emissions have been compared with the numbers in the schedule, those members that reduce emissions below these levels are rewarded and can sell or bank their excess CFIs or credits, while those with emissions above the reduction schedule are penalized, run up a debit and must purchase CFIs in order to achieve compliance. Debits include required purchases of CEIs to meet the reduction schedule.

Advantageously, the emission reduction schedule is uniform and easily understood. Its simplicity facilitates participation by a diverse range of businesses and other entities, thus increasing both the environmental effectiveness of the program and the potential for enrollment of entities that are able to reduce emissions at low-cost. As shown in Table 1 below, the emission reduction objective declines 1% per year, and the cumulative four-year emission reduction relative baseline emission levels is 10% (1%+2%+3%+4%). This simple value facilitates easy analysis of potential implications of participation as well as planning efforts.

TABLE 1

| Year | Market Emission Reduction Schedule, Exchange Allowance Allocations |
| --- | --- |
| 2003 | 1% below participant's baseline |
| 2004 | 2% below participant's baseline |
| 2005 | 3% below participant's baseline |
| 2006 | 4% below participant's baseline |

Each member is preferably allocated a four-year stream of emission allowances. The registry 12 (or the registry 102 in the case of the system 100 of FIG. 3) employs a system that identifies the vintage of each instrument. The market monitors instrument transfers and holdings and facilitates the oversight needed to enforce rules, such as the restrictions on banking and the single-firm sales limit.

Figure 5:
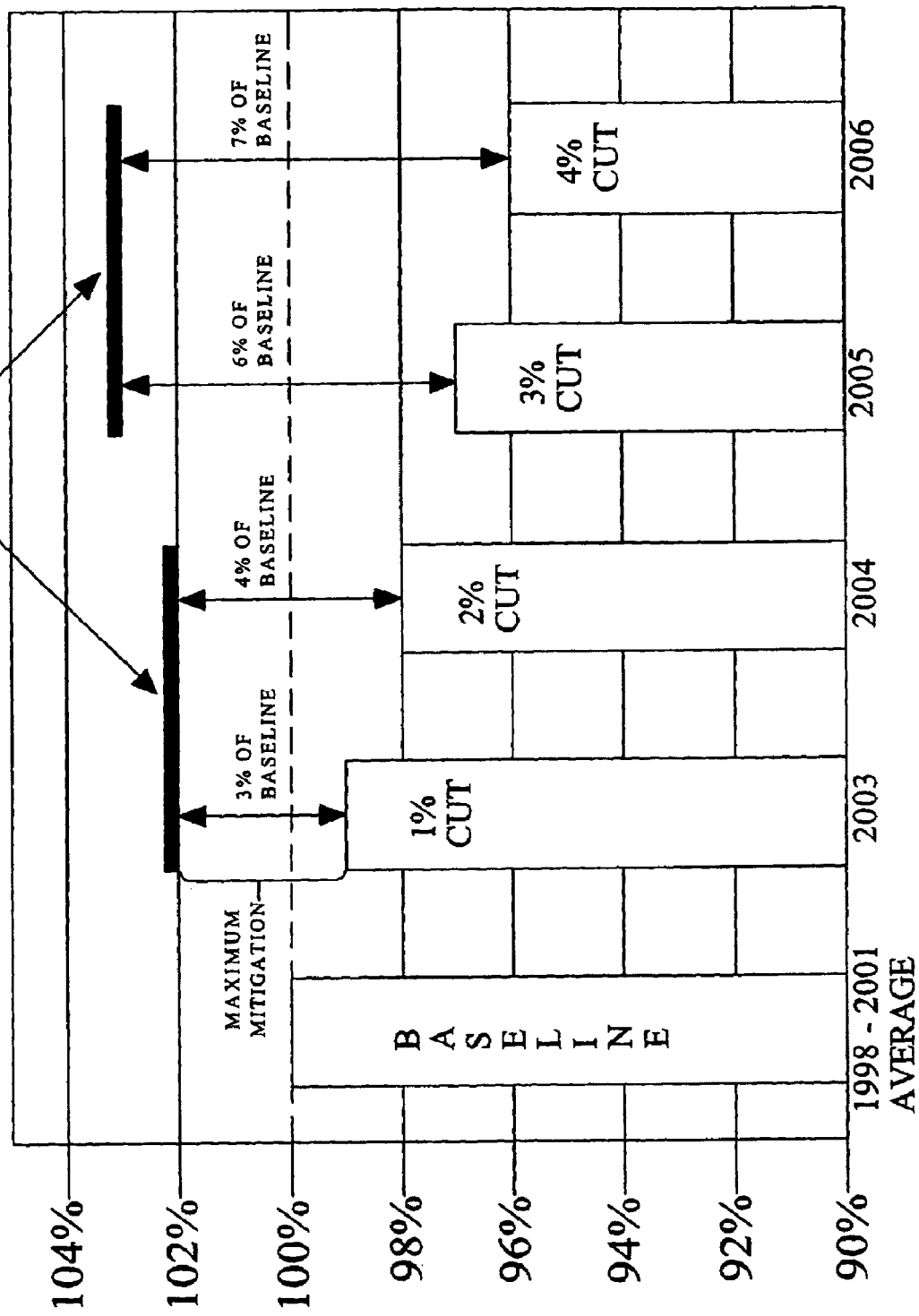
FIG. 5 is a graph of an exemplary emissions baseline, reduction schedule, economic growth provision, and maximum mitigation quantities.

FIG. 5 illustrates a graph of an exemplary emission baseline, reduction schedule, economic growth provision, and maximum mitigation quantities. The graph includes a dotted line horizontally across from 100% to designate an emission baseline for a particular member. Each year going forward, emission targets are reduced by a reduction schedule. The graph depicts a yearly reduction schedule of 1% per year.

The graph of FIG. 5 also indicates that the maximum quantity of emission mitigation required rises at a fixed rate over time. In an exemplary embodiment, the market is configured such that the maximum amount of $CO_2$ equivalent emissions recognized in determining the annual true-up for each member is 2% above that participant's baseline emission level during year 1 and year 2, and 3% above baseline during year 3 and year 4. As such, there is an established limitation on the risk exposure faced by pilot market participants. Without such a provision, the maximum potential quantity of purchases of CFIs that each member may face would be unknown. This mechanism allows potential participants to know, in advance with certainty, the maximum quantity of purchases they may have to undertake to achieve compliance with the annual emission reduction commitments. This provision is referred to as the economic growth provision.

Figure 6:
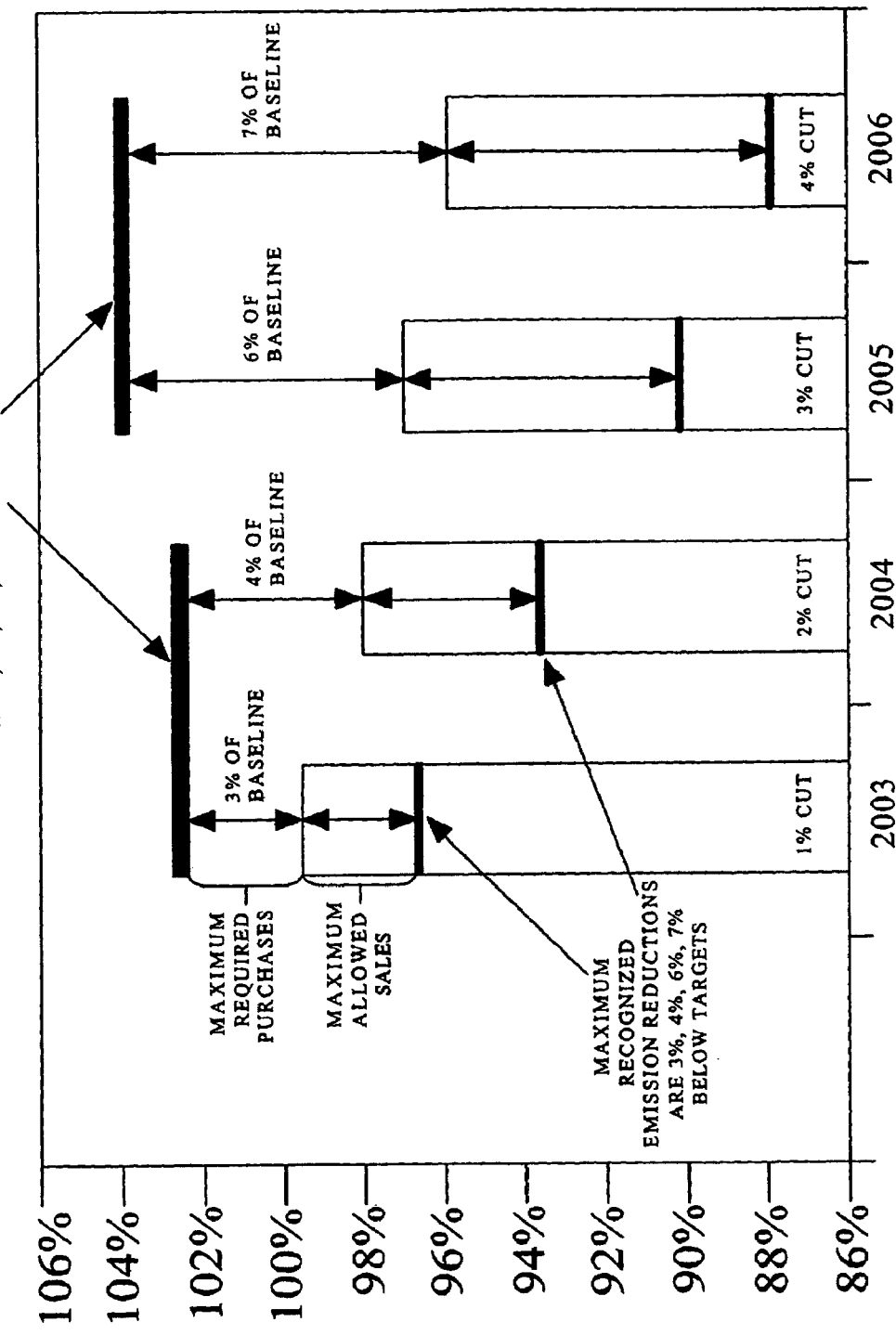
FIG. 6 is a graph of an exemplary growth provision, maximum required purchases, and allowed sales quantities.

FIG. 6 illustrates a graph of an exemplary economic growth provision, maximum required purchases, and allowed sales quantities described with respect to FIG. 5. For each instrument vintage, there is a maximum number of emission allowances that can be sold as well as a maximum number of emission allowances that must be bought. These restrictions reflect the symmetric application of the economic growth provision.

Emissions levels can be unpredictable and are often influenced by factors external to a business (e.g., weather, economic conditions, plant outages). The economic growth provision provides a measure of insulation against such uncertainties. This risk-reducing feature allows potential members to establish better-informed estimates of the highest possible financial exposure associated with participation. This increased predictability is expected to result in greater participation in the voluntary market, thus yielding more environmental progress and helping to advance market infrastructure while developing human capital in greenhouse gas (GHG) emissions trading. The benefits of this provision are particularly important for entities facing rapid emissions growth (e.g., due to population growth in their customer base). Development of tools for initiating GHG mitigation efforts in countries with rapid emissions growth, such as China and India, is recognized as one of the world's significant challenges in the long-term global effort to effectively counter the threats of global climate change.

At the same time, there is a limit applied to participants in the market to allowed sales. In an exemplary embodiment, maximum recognized emission reductions mirror the maximum required purchases. For example, sales are limited to 6% of baseline where required purchases are limited to 6%.

Certain individual members may be in a position to sell large quantities of exchange allowances. Should any single member or small group of members be allowed to sell without limit, the market could become imbalanced and subject to price congestion. Similarly, unrestrained ability to sell could cause a single-firm to achieve a dominant status of the sell-side of the market, which would be damaging to market competition. Thus, the quantity of sales any single firm can make is constrained to avoid market imbalance, price congestion and potential for market dominance by a single seller or a small group of sellers of exchange allowances. This provision is applied to all members that have baseline emissions in excess of 100,000 metric tons $CO_2$ equivalent. This exception reflects the fact that unrestricted sales by small members would not cause undesirable market impacts, and that removal of such constraint increases the likelihood that the fixed costs of market membership can be more than offset from proceeds from sales of CFIs.

Net allowed sales by a single firm are preferably escalated if program-wide emissions rise above baseline levels. The escalation mechanism reflects the extent to which program-wide emissions rise above program-wide baseline emission levels. For a particular vintage, each member is allowed to sell and/or bank the quantity of allowances that is the lesser of the quantities determined by the symmetric economic growth provision and the single firm sales limit. (In this context, allowed sales means the net sales by the member.) If for the first vintage year, the single firm sales limit is less than the quantity determined by the symmetric economic growth provision, then the difference between those two quantities is placed in a special reserve for possible future release.

For subsequent vintages, each member is allowed to sell and/or bank the quantity that is the lesser of the quantities determined by the economic growth provision and the single firm sales limit. For these vintages, members may also bank the amount by which the quantity determined by the economic growth provision exceeds the single firm sales limit.

As such, market imbalance and price congestion that might arise if members are allowed to carry forward large amounts of surplus exchange allowances that may arise due to economic recession or other factors are avoided.

Figure 7:
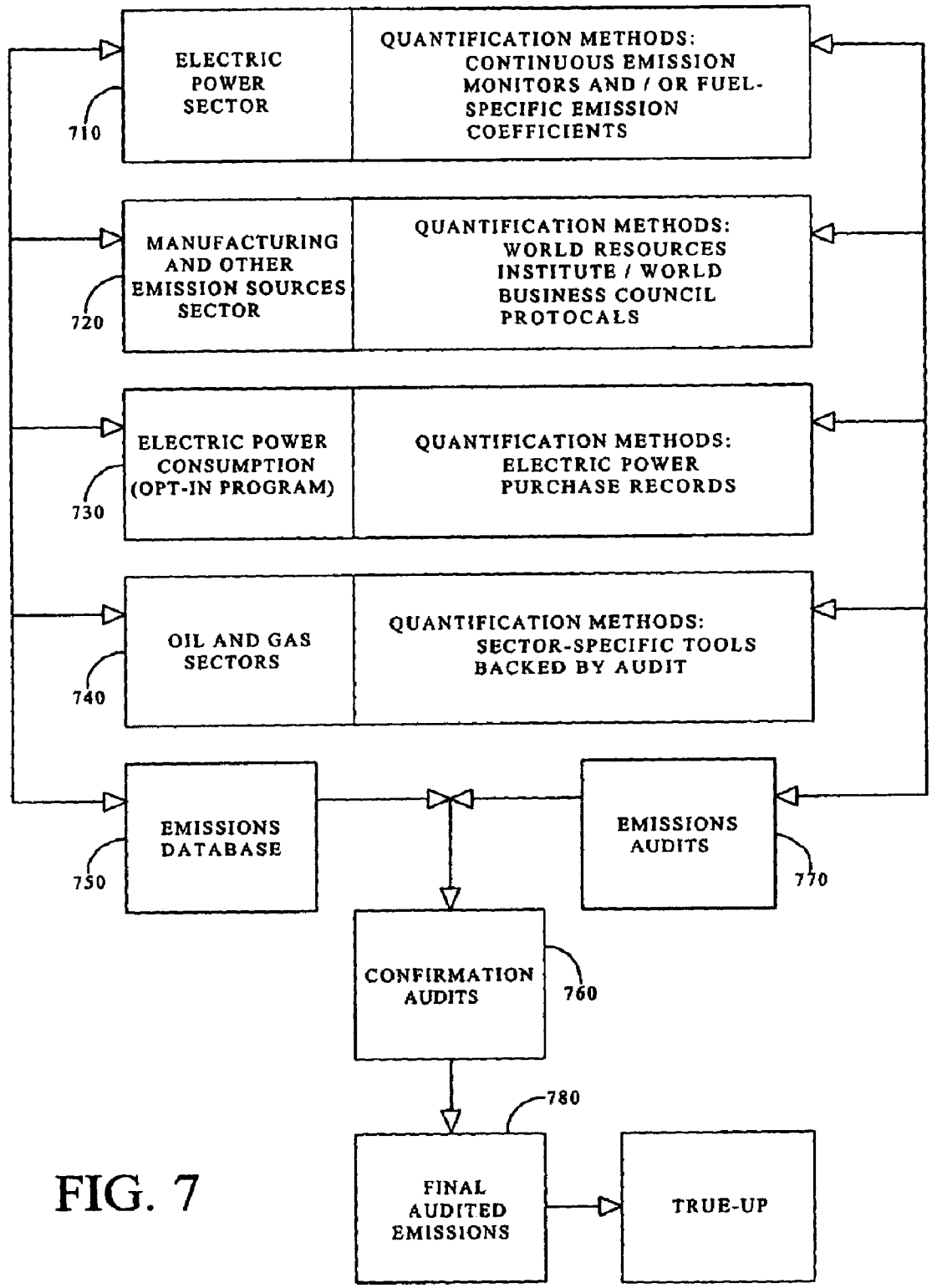
FIG. 7 is a diagrammatic representation of multi-sector emissions monitoring, reporting, and auditing for emissions baselines and periodic emissions reports.

FIG. 7 illustrates the market as applied to multi-sector emissions monitoring, reporting, and auditing for emissions baselines and periodic emissions reports. Any of a number of market sectors, such as an electric power sector 710, a manufacturing sector 720, an electric power consumption sector 730, and an oil and gas sector 740, can report information to an emissions database 750 in the system 10 or the system 100. For example, the electric power sector 710 can use a quantification method of continuous emission monitors and/or fuel specific emission coefficients. The electric power sector 710 can also perform coal testing for carbon content. Emissions information obtained using these types of quantification methods is communicated to the emissions database 750.

The information received from sectors 710-740 by emissions database 750 can be used by the market to make confirmations and adjustments to CFIs in an operation 760. NASD emissions audits 770 can be used in the operation 760 to make these confirmations and adjustments. Final audited emissions 780 can be used in a true up process described below with reference to FIG. 8.

Additional, fewer, or different sectors may be included in the market besides or in place of sectors 710-740. In an exemplary embodiment, members primarily engaged in electric power production include in their baseline and quarterly emission reports $CO_2$ emissions from all power generation facilities having a rated capacity of 25 megawatts or larger. These members may opt-in emissions from facilities having rated capacity less than 25 megawatts, but must include all such facilities if this option is chosen. Electric power generating units use $CO_2$ emissions data from continuous emission monitors (CEMs) as reported to the U.S. Environmental Protection Agency. In other cases where CEM data is not available, such members quantify $CO_2$ emissions by using the fuel consumption methods contained in government regulations.

These provisions represent adoption of specified rules for $CO_2$ emissions monitoring and facilities inclusion for participation by entities primarily engaged in electric power generation in an organized GHG reduction and trading program. Advantageously, this provides a multi-sector GHG trading program for electric power generating plants.

Market electric power sector members may also opt-in $SF_6$ emissions from electric power transmission equipment. Emissions from such systems can be quantified using protocols provided by the U.S. Environmental Protection Agency. These members may also opt-in emissions from vehicles they own and operate or lease by using the protocols developed by the World Resources Institute/World Business Council for Sustainable Development (WRI/WBCSD) initiative. These provisions represent adoption of specified rules for $SF_6$ emissions monitoring and facilities inclusion for participation by entities primarily engaged in electric power generation in an organized GHG reduction and trading program.

Other members, including members in the forest products, chemicals, cement, manufacturing, and municipal sectors can report greenhouse gas emissions as follows. $CO_2$ emissions from stationary source fossil fuel combustion can be quantified using the protocols developed by the WRI/WBCSD. Process emissions (e.g., $N_2O$, PFCs and $CO_2$) can be quantified using applicable WRI/WBCSD protocols. $CO_2$ emissions from vehicles can be included in the member's baseline and quarterly emission reports if these emissions are greater than 5% of total entity-wide emissions and represent an integral part of the member's operations. Otherwise, members have the option to include emissions from vehicles in their baseline emissions and quarterly emission reports. Vehicle emissions can be quantified using the WRI/WBCSD protocols.

Member sources not primarily engaged in the production of electricity may opt-in purchased electricity (sector 730 in FIG. 7) as a supplemental reduction objective. When this option is elected, reduction commitments for purchased electricity are identical to the market emission reduction schedule (e.g., 1% below baseline in 2003, 2% below baseline in 2004, 3% below baseline in 2005, 4% below baseline in 2006). Members that elect this option receive greenhouse gas emission allowances when the reduction objective is exceeded. When members opt-in their electricity purchases and their electricity purchase reduction objective is not achieved, the member must surrender greenhouse gas emission allowances and/or XOs.

The market can specify methods for monitoring emissions and credit allowance activities for a variety of sectors and activities. Members in the forest products sector that have wood harvesting operations can quantify and report net changes in carbon stocks (expressed in metric tons of $CO_2$ equivalent) held in above-ground biomass on land owned by the member or on land for which the member owns carbon sequestration rights. Exchange allowances (XAs) can be issued on an annual basis to these members in an amount reflecting net increases in stored carbon from the previous year. These allowances have the vintage of the year in which the increase in carbon storage occurred. These members surrender XAs, XOs or XEs on an annual basis in an amount reflecting net decreases in carbon stored in above-ground biomass.

Advantageously, the market participant base can be enlarged as additional entities seek to enroll. Typically, members will include corporations, industrial companies. municipalities, and other entities that generate emissions of $CO_2$, $SO_2$ or other gases from facilities in various neighboring countries, e.g., the United States, Canada, and Mexico, and commit to an emission reduction schedule. Expansion, however, can be managed with a view to furthering the goals of the exchange and avoiding price congestion. New members can be bound to the same terms and obligations as original members. Use of a standardized, proportional emissions reduction schedule simplifies the addition of new members as the emission reduction objective of each existing members is not altered when new participants join the exchange. The capability of potential participants to join the exchange is continually changing as the strategic benefits of joining are better appreciated, and as the required skills base is expanded. Expansion of membership automatically causes an expansion of the trading opportunities for members and offset providers based on pre-set formulae.

In an exemplary embodiment, entities meeting the following conditions may become associate members: the entity does not have direct emissions; and the entity commits to the mitigation schedule or a mitigation objective that goes beyond the schedule. Examples of associate members include businesses, individuals, families, or other groups. Associate members can be subject to the same external audit of true-up that is conducted for members. Members and associate members can be grouped together as "voluntary greenhouse gas emission reducers" or participants that commit to an emission reduction schedule in an effort to reduce pollution such as greenhouse gas emissions.

Figure 15:
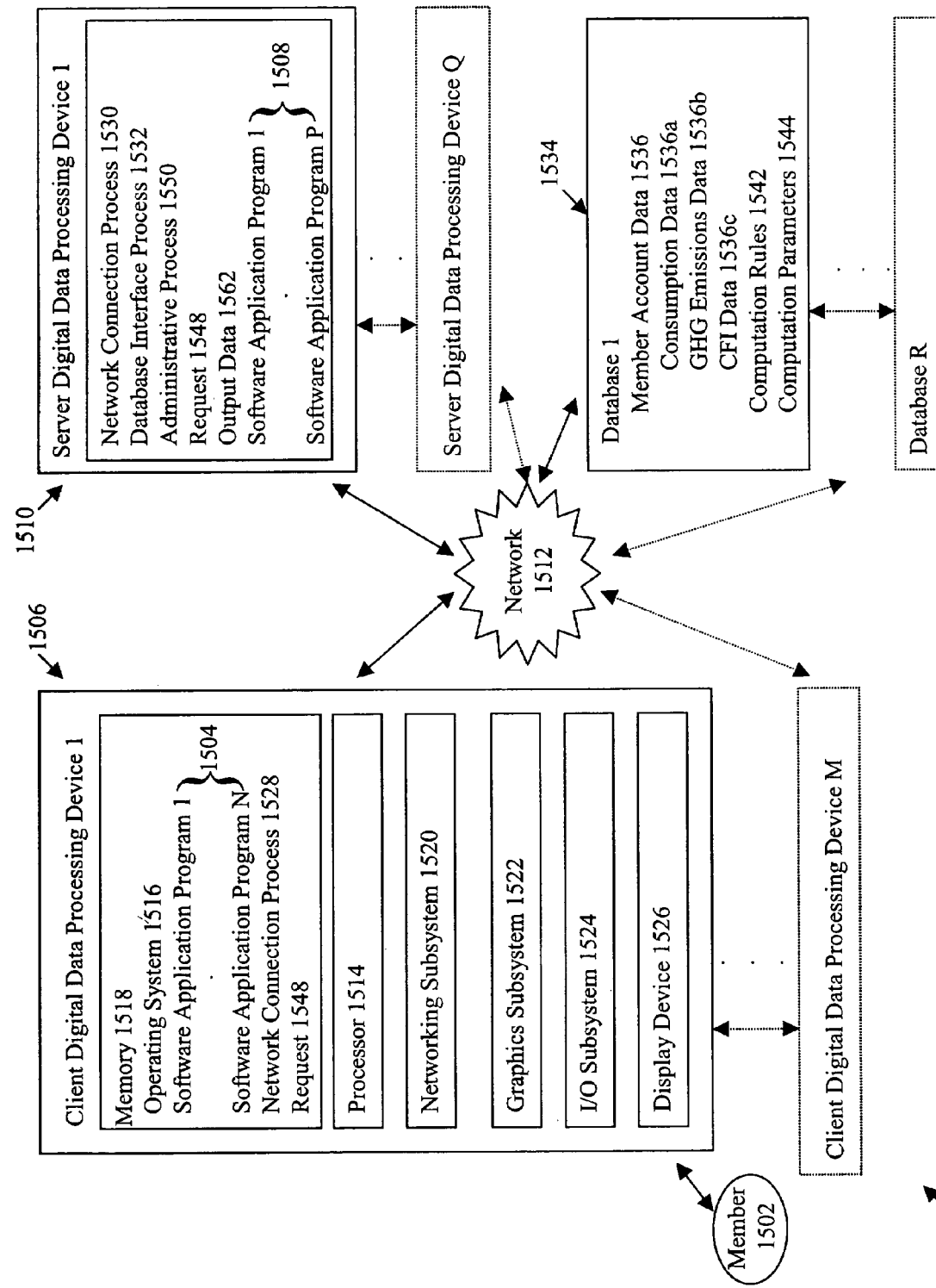
FIG. 15 schematically illustrates another exemplary embodiment of an emissions reduction trading system.
Figure 16:
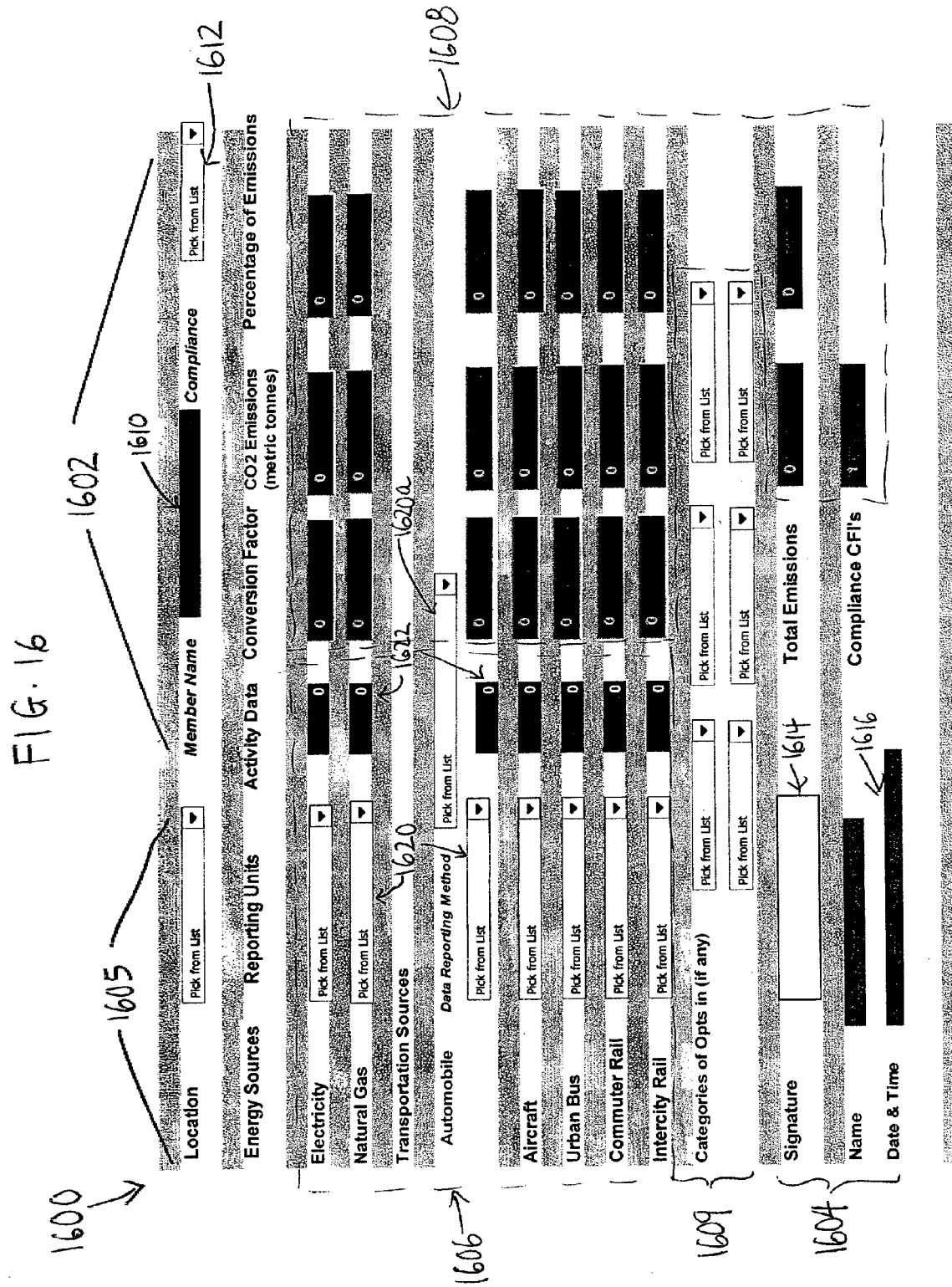
FIG. 16 schematically illustrates an exemplary display of a graphical user interface that facilitates computations of GHG emissions and compliance CFIs.
Figure 17:
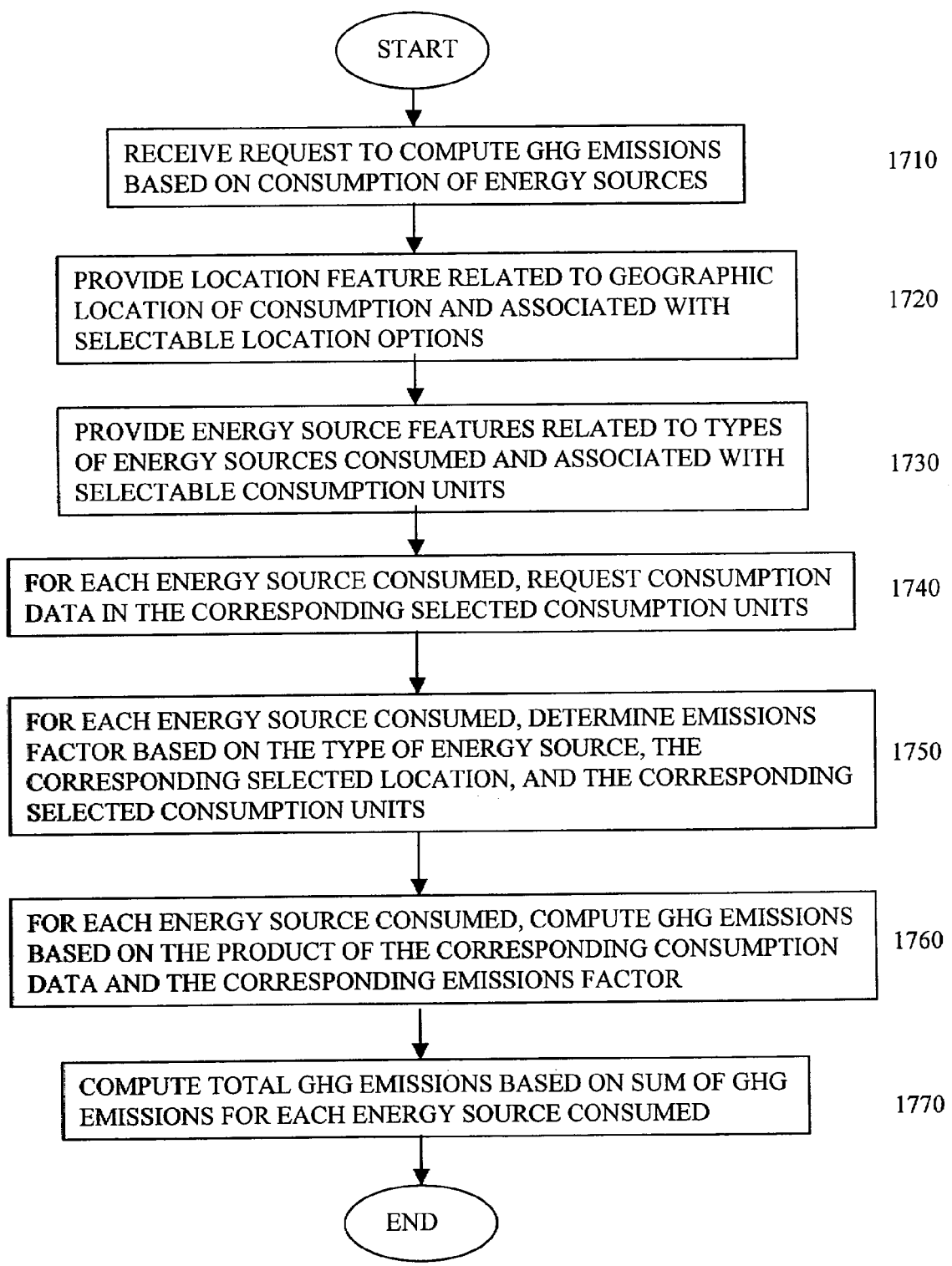
FIG. 17 schematically illustrates an embodiment of a method for computing GHG emissions in the exemplary system of FIG. 15.

In certain embodiments, emissions numbers for associate members are computed based on the schemes described herein with respect to FIGS. 15-17. Thus, the invention provides a simple yet effective method and system for calculating the emission numbers.

Additional entities that may participate in the system include environmental benefactors and exchange participants. Environmental benefactors are participants that have not necessarily committed to an emission reduction schedule, but that act to prevent or remove pollution. Environmental benefactors can be, for example, offset providers, liquidity providers and intermediaries that trade on the system but do not have an emission reduction schedule. Offset providers are entities such as project owners, project implementers, registered aggregators, market makers and entities selling exchange offsets produced by qualifying registered offset projects. Liquidity providers are entities or individuals who trade on the exchange for reasons other than compliance with the emission reduction schedule. These include entities such as market makers and proprietary trading groups. Exchange participants are entities or natural persons that establish a registry account for the purpose of acquiring CFIs.

By allowing a broad range of entities to participate in the market, including entities that are not large industrial or energy concerns, the market encourages broader adoption of greenhouse gas reduction objectives, as well as the adoption of new and creative mitigation objectives (e.g. entities may wish to become carbon neutral for "indirect" emissions associated with company travel on commercial airlines). Thus, a member that fails to achieve its reduction schedule is not limited to purchasing its debits from just other members. Environmental benefactors may also provide the CFIs needed to remove such debits from member accounts. For example, a forester or farmer is issued credits for participating in environmentally friendly activities, such as planting trees or removing pollutants from a stream. A member who exceeds its emissions level can purchase these credits from the forester or farmer to make up for its own emissions allowance shortfall.

An annual report of emission reductions may optionally, but preferably, be generated by the system. This aids in facilitating emissions reduction and describes member performance, i.e., if the member has met its emission reduction schedule. The report may be published in, for example, a member's report to its shareholders and distributed during stockholder meetings, and used as a public relations tool in touting the member's environmentally conscious practices.

The system described herein provides a platform for members, associate members, and other participants to trade in CFIs and facilitates their trading. Participation in the present system is completely voluntary and provides numerous incentives for market players to participate. The system creates a market where secondary players can trade in and provide valuable commodities to other industry players in need.

Entities can contribute to mitigation of greenhouse gases by reducing electricity purchases (e.g., through improved "end use" efficiency), reducing travel, or reducing $CO_2$ generating activities such as burning trash or building campfires. Such entities are credited when the reduction objectives are exceeded, or are held responsible to purchase CFIs reflecting mitigation elsewhere in the market if such standardized reduction objectives are not achieved. The opt-in electricity purchase provision is described further below with respect to FIG. 10.

Figure 8:
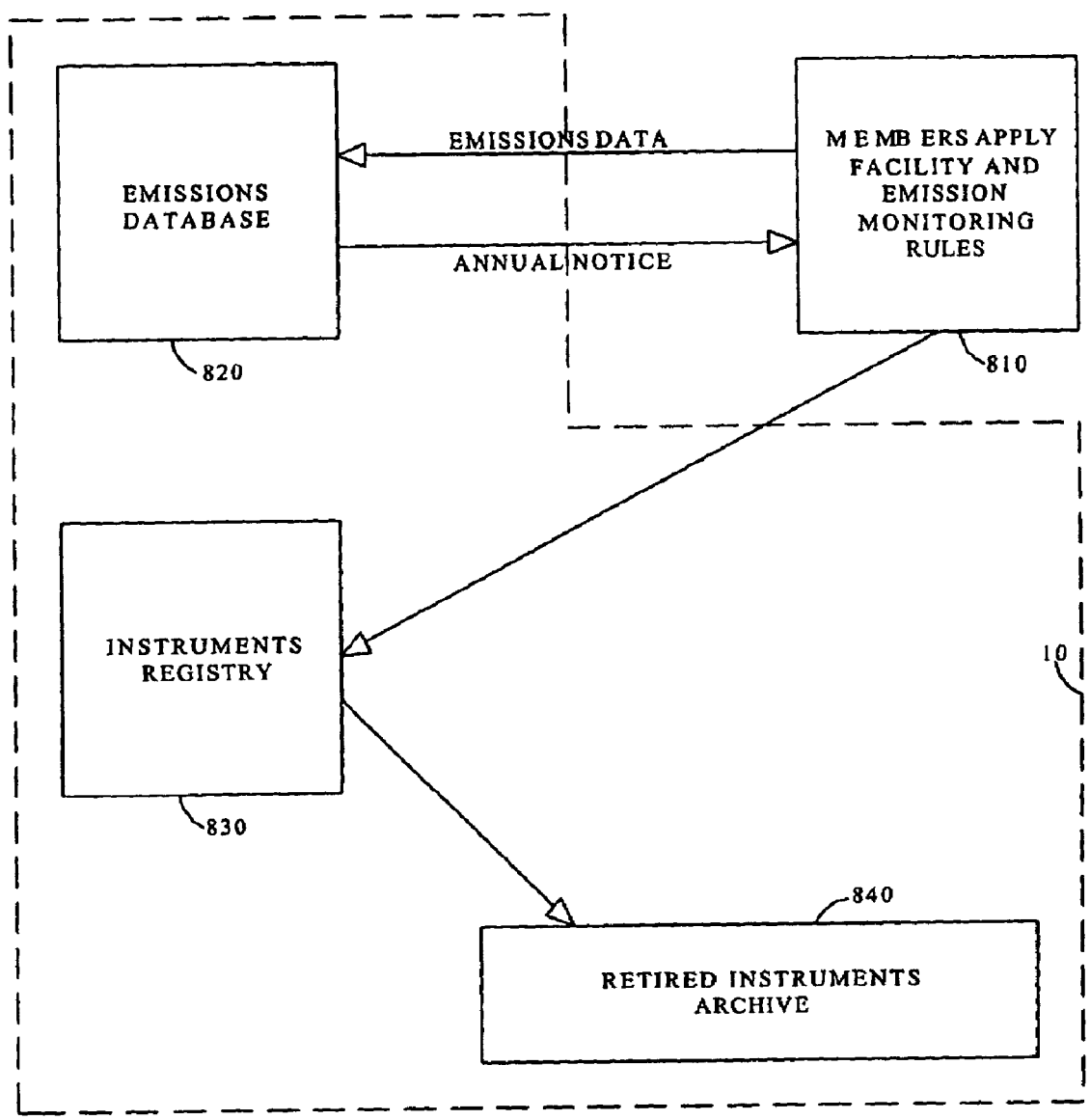
FIG. 8 is a diagrammatic representation of an exemplary true-up process.

FIG. 8 illustrates a flow diagram of an exemplary true-up process utilized in the system 10 described with reference to FIG. 1 and/or the system 100 described with reference to FIG. 3. The true-up process can involve the following operations, additional operations, or fewer operations depending on the embodiment. Members of the market apply facility and emissions monitoring rules to generate emissions data in an operation 810. The emissions data is communicated to the market and stored in an emissions database in an operation 820.

In accordance with true-up procedures, members are provided with annual notice of required instrument surrender quantities. Subsequent to each compliance year, each member must surrender any combination of exchange allowances, exchange offsets and exchange early action credits in an amount equal to $CO_2$ equivalent emissions released from that member's included facilities during the compliance year (subject to the economic growth provision described with respect to FIGS. 5 and 6 and constraints on the use of XOs and XEs). Compliance through the surrender of three different forms of CFIs allows mitigation resources to flow to their highest-impact-per-dollar activity (e.g., emissions mitigation by members or by offset projects). It also makes operational the recognition and crediting of certain mitigation projects undertaken in advance of program launch.

Members provide notification of the instrument types and vintages to be retired in fulfillment of compliance commitment to the registry in the system in an operation 830. Data contained in the registry can be communicated to a retired CFIs archive in an operation 840. As such, members "true-up" or account for allowances, offsets, and other emissions data. The market can also make adjustments in the allowed usage of offsets and early action credits based on the reported emissions data for all of the members.

Figure 9:
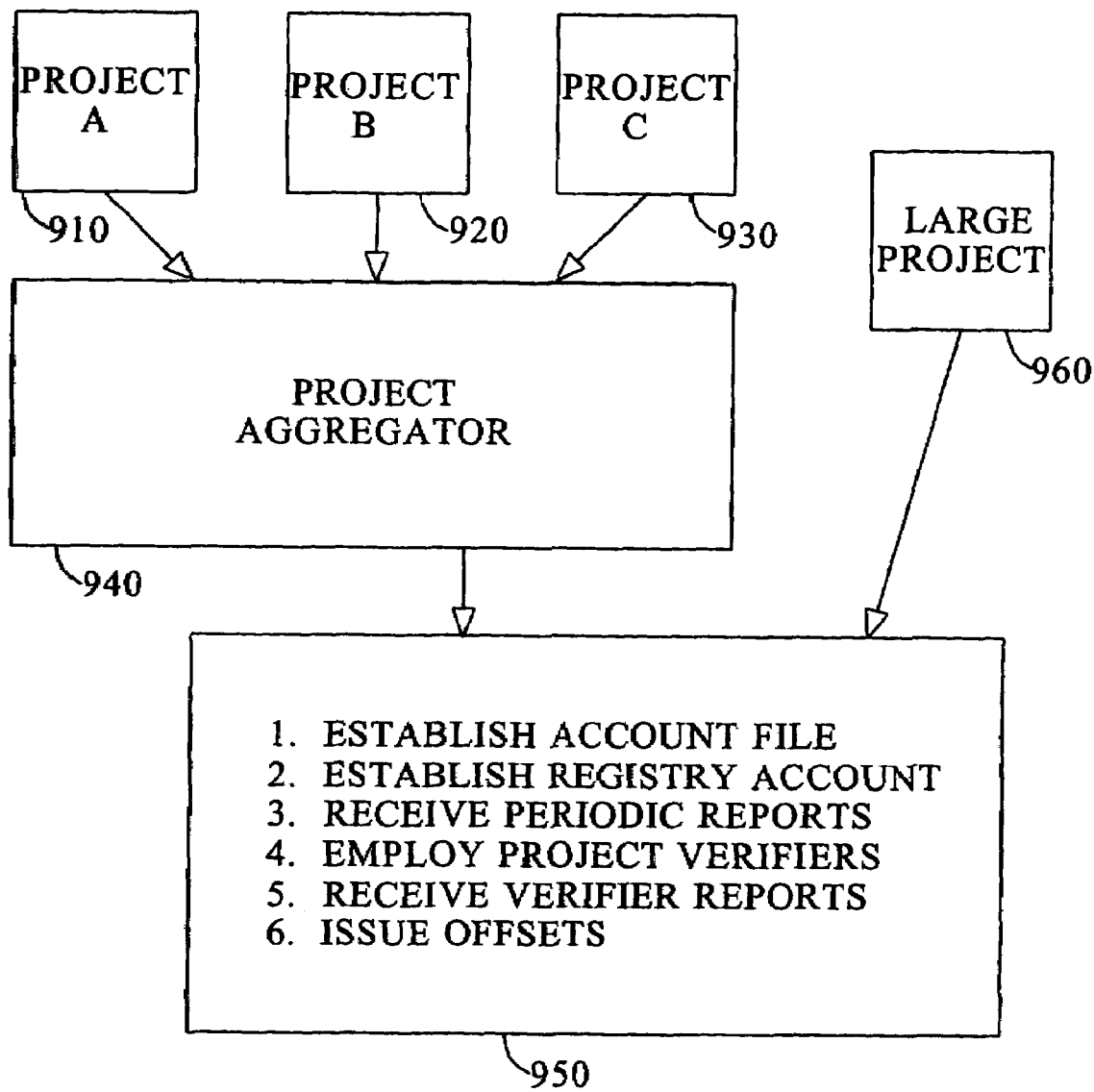
FIG. 9 is a diagrammatic representation of exemplary offset project registration and reporting.

FIG. 9 illustrates offset project registration and reporting operations in the system 10 (FIG. 1) and/or the system 100 (FIG. 3). Additional, fewer, or different operations can be performed depending on the particular embodiment. In an exemplary embodiment, small projects 910, 920, and 930 have less than 10,000 metric tons of $CO_2$ per year. Small projects 910, 920, and 930 are combined in an aggregator operation 940.

Eligible projects can be recorded in the registry and are issued exchange offsets (XOs) on the basis of mitigation tonnage realized during a four year period. XOs can be issued after mitigation occurs and required documentation is presented to the market, or can be issued concurrently in anticipation of receipt of such documentation.

Offsets or credits are generated according to a predetermined schedule of environmental friendly activities, such as by planting trees that absorb $CO_2$, by keeping carbon released by plants in the soil, or by removing pollutants, such as CO, lead, $NO_2$, or ozone, from streams, lakes, landfills or other environmentally unfriendly areas. Indirect reductions of greenhouse gas emissions can be obtained by reducing reliance on the use of fossil fuels, such as by reducing business travel or by purchasing environmentally friendly products such as those made by processes that do not adversely affect the environment. A first category of participants who are eligible to be offset providers therefore includes foresters, farmers and others who prepare the land for facilitating a reduction in $CO_2$ emissions. Types of entities that would likely fall within a second category are law firms, advertising agencies, banks, shopping centers, supermarkets, or other entities or locations that include a large number of individuals.

A system for independent verification of qualifying offset projects is preferably included. Independent verification provides a basis for the grant of credits and allowances, and ensures that carbon sequestration activities are accounted for accurately. Independent verification may be performed, for example, by an independently contracted party, or any party qualified to make such an assessment. Ideally, independent verification would occur at least every year before the true-up process.

Other eligible offset project categories include landfill methane destruction in North America; agricultural methane destruction in North America; carbon sequestration in North America reforestation projects; carbon sequestration in U.S. agricultural soils; and fuel switching, landfill methane destruction, renewable energy and forestry projects in Brazil, recycling, alternative travel, and other environmentally harmonious activities. For offset project types that have uncertain mitigation effectiveness, standardization of tradable offset quantities is achieved by applying discount factors so that members can have high confidence that a particular activity is defined so that each metric ton of $CO_2$ mitigated by each project is equivalent.

As shown in FIG. 9, a minimum amount of exchange offsets (XO) issuance to any project or group of projects in any single category can be set at 10,000 tons $CO_2$ equivalent per year (as an example). Individual projects that achieve mitigation quantities of less that 10,000 tons $CO_2$ equivalent per year are combined with other projects within the same project category by a market registered project aggregator. As such, trading can occur in quantities less than 10,000 tons.

The market can use the 10,000-ton threshold rule as a standard that establishes an offset pool scale allowing for economically efficient administration of the project enrollment, verification and offset issuance process. This provision allows low-cost mitigation actions to supply the market with reductions while also providing a source of funding for the implementation of such projects.

In the aggregator operation 940, the projects 910, 920, and 930 are examined to determine various features, such as, project eligibility based on type, location, and timing; whether contracts and/or attestations are properly executed; and estimated annual tonnage of offsets produced. Other examined features can include time commitments and property descriptions of sequestration projects, annual report acknowledgment, verifier access acknowledgment, entity name and facility, and management issues. The project-aggregation process of operation 940 allows multiple small projects to participate in the market without forcing the exchange or market participants to incur high administrative costs.

In an operation 950, the aggregation of small projects 910, 920, and 930 or a large project 970 are subject to a registration and reporting process. An exemplary registration and reporting process includes establishing an account file, establishing a registry account, receiving project reports, defining eligible project verifiers, receiving project verification reports from verifiers, receiving NASD reports on verifiers, and issuing offsets to accounts.

In another embodiment, carbon sequestration reserve pools are established to hold back a portion of earned offsets from project aggregators. These reserve pools provide a readily accessible pool of offsets that can be immediately cancelled if carbon stored in a credited sequestration project is later released to the atmosphere.

Figure 10:
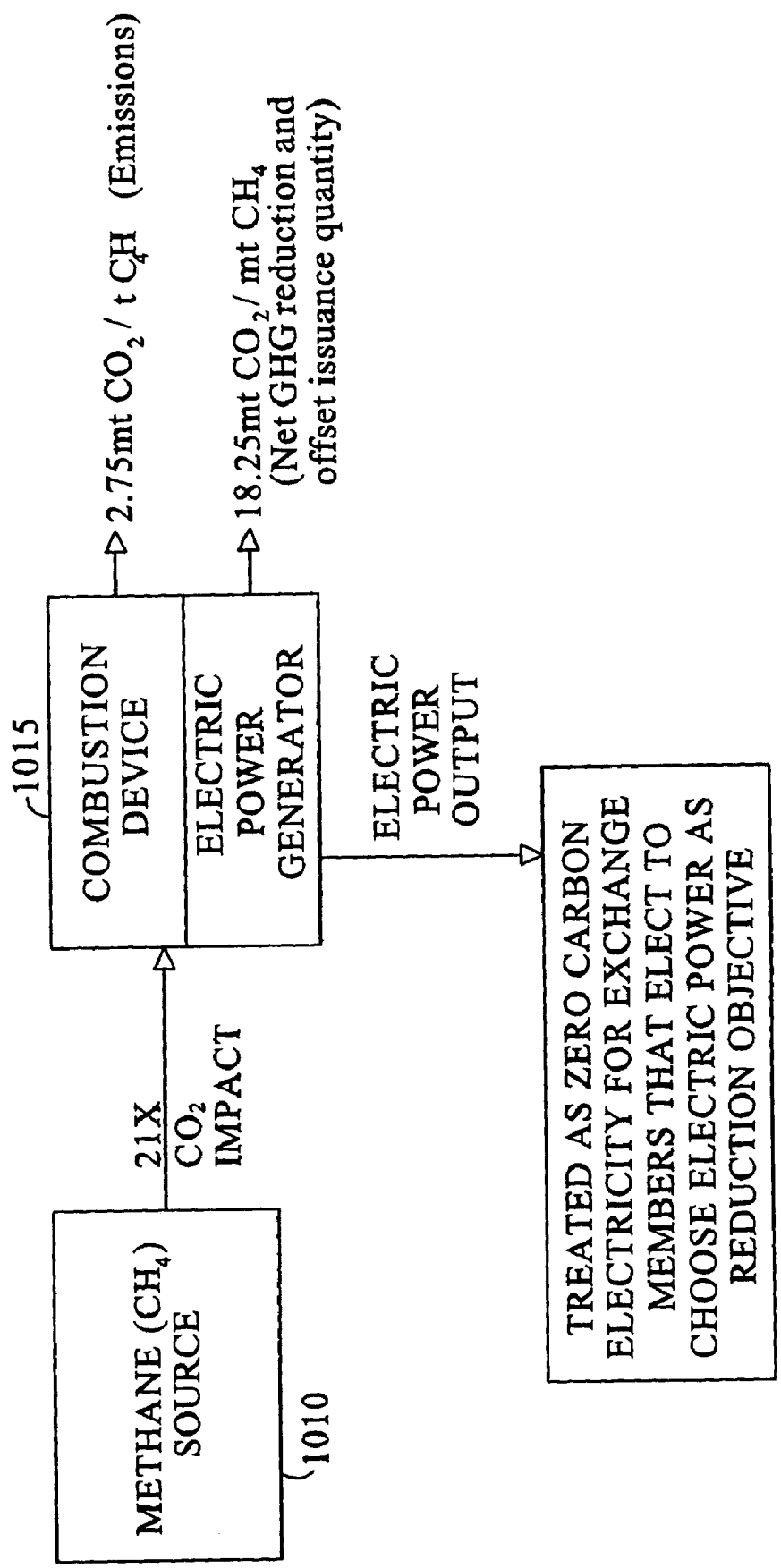
FIG. 10 is a diagrammatic representation of an exemplary crediting mechanism for methane combustion.

FIG. 10 illustrates a crediting mechanism for methane combustion. A methane ($CH_4$) source 1010 can be a landfill or agricultural waste, for example. Methane can have twenty-one times more environmental impact than $CO_2$. It is possible, however, to burn the methane using a combustion device 1015. The burning converts the methane to $CO_2$ while creating electric power from an electric power generator 1020. The burning of methane releases 2.75 tons of $CO_2$ for every one ton of methane. As such, the net equivalent emission reduction from burning methane is 18.25 metric tons of $CO_2$. Thus, an exchange landfill offset (XLO) can be issued in the market.

To account for offset projects efficiently and accurately, two types of accounting procedures may be used. The carbon-stable accounting approach may be used by members or participants who, for example, practice conservation soil tillage or are in commercial forestry sector, to quantify changes in carbon stocks on its commercial land. A member or participant electing to use this approach must obtain reputable third-party verification that its commercial land is managed in a sustainable fashion and provide a warranty that there will be no net decrease in overall carbon stocks on that land. In the commercial forestry sector, a member or participant in the United States may quantify and report changes in carbon stocks associated with individually registered exchange forestry offset projects on the condition that that there is no net decrease in overall carbon stocks in the member or participant's commercial forest inventory.

Each member or participant in the commercial forestry sector electing to use the carbon-stable accounting approach will additionally be required to annually submit evidence that it has maintained certification of sustainable forest management and shall provide annual certification, signed by a corporate officer, that there will be no net decrease in overall carbon stocks held in the member or participant's commercial forestry inventory. The statement that there is no decrease in overall carbon stocks held in a member or participant's commercial forestry inventory is subject to independent verification and audit.

The model-based accounting approach can be used by a member or participant from, for example, the commercial forestry sector, to quantify changes in carbon stocks on its commercial forestry land on the basis of projections made by growth and yield models, which estimate the volume of above-ground biomass of different species of trees as the trees grow. Each member or participant that elects to use the model-based accounting approach will be issued exchange allowances or debited CFIs on the basis of annual increases or decreases respectively in carbon stocks in its commercial inventory.

Net changes in carbon stocks will be quantified only on the basis of the wood in the main stem of the tree up to the terminal bud, excluding carbon sequestered in root systems and the branches. Quantifications of carbon stocks reduced through harvest will also include only the main stem of the tree.

In cases of adverse weather events or outbreaks of fire and pest damage that do not reduce the quantity of carbon stocks on a parcel of forested land, the member or participant is required to document the quantity of timber destroyed by the fire, pest or adverse weather and surrender an equivalent amount of CFIs. The member or participant is required to continue to quantify and report subsequent increases and decreases in carbon stocks on that land and shall be issued and must surrender CFIs accordingly.

A market member 1030 can purchase electric power from the electric power generator 1020 as an emission reduction objective. The market member 1030 is selecting power in a way that returns "green power crediting" with the market. In an exemplary embodiment, landfill methane collection and combustion systems placed into operation can be issued exchange landfill offsets on the basis of tons of methane destroyed, net of $CO_2$ released upon combustion, during the years 2003 through 2006, for example. Benchmarks for methane reduction help remove uncertainty over which landfill gas projects can receive offsets, and at what rate and help ensure there is proper accounting so that electricity produced by combustion of landfill gas can be properly treated as $CO_2$ "neutral" (i.e., having no net GHG emissions associated with its production). As such, the benchmarks provide predictability and clarity in relation to determining if a landfill gas collection system qualifies to earn GHG offsets.

The use of the 18.25 metric ton net offset issuance rule (for each ton of methane combusted) accounts for the net-of-$CO_2$ GHG benefit from combusting landfill methane. This rule concomitantly establishes that electric power produced by combustion of landfill gas is $CO_2$-neutral as the $CO_2$ released upon combustion is netted-out in the offset issuance calculation. This characteristic thus establishes a complete and accurate accounting process that allows such purchased electricity to be considered "zero emissions."

The market allows electricity users to elect to include electricity purchases as a supplemental reduction commitment. If a market member that elects this option reduces it electricity purchases to a level that is below its targeted reduction, the member is issued 0.61 tradable emission allowances for each megawatt-hour by which the member's actual electricity purchases fall below the reduction target. This is a simple conversion that does not require complex calculations to determine the allowance or credit. Simultaneously, the generator of such electricity also realizes an emission reduction (all else constant) as a result of reduced electricity demand on the part of the member. This reduction in emissions at the electric power plant can have the effect of freeing-up an emission allowances for sale. As such, this feature introduces the possibility that a single ton of actual emission reductions may result in the release into the market system of two tons worth of rights to emit $CO_2$, and the ownership of such rights is equally shared between the electricity user and the electricity generator. This pre-established equal sharing provides a standard formula that eliminates the need to negotiate the sharing of emission reduction rights associated with reduced electricity consumption.

The opt-in electricity purchase provision establishes a mechanism that employs standardized reduction schedule for end-use of electricity as a supplemental mitigation objective that can be elected by members. This provision also establishes a known, predictable quantity by which excess (or insufficient) electric power reductions are issued (or must surrender) greenhouse gas emission allowances. This predictability facilitates participation in this mitigation option and may stimulate adoption of electricity reduction technologies as the financial returns to such technologies are enhanced by the ability to earn marketable greenhouse gas emission allowances in the market.

The baseline electricity purchase quantity can be defined as the average of electricity purchases during previous years, such as 1998 through 2001. The baseline can be adjusted to reflect acquisition or disposition of facilities that consumed power purchased by the member. The definition of the electricity purchase baseline also contains rules governing inclusion of facilities; specifications for defining emissions "ownership" at jointly-owned facilities; and rules for addressing gaps in the baseline period electricity purchase data.

In an exemplary embodiment, members that opt-in U.S. electricity purchases and reduce their electricity purchases to levels below the quantity corresponding to the market reduction schedule are issued greenhouse gas emission allowances at a rate of 0.61 metric tons $CO_2$ for each megawatt-hour by which actual power purchased is below the reduction schedule. The 0.61 metric ton rate is applied only to electricity purchased by U.S. facilities as it reflects the U.S. average emission rate for electricity production during 1998-2001. Preferably, that opt-in electricity purchases and realize electricity purchases in an amount that is above the quantity corresponding to the market reduction schedule surrender greenhouse gas emission allowances and/or exchange offsets at a rate of 0.61 metric tons $CO_2$ for each megawatt-hour by which actual power purchased is above the reduction schedule. The corresponding standard values for electricity purchases in Canada and Mexico are 0.20 and 0.59 metric tons per megawatt-hour, respectively.

By setting a single, stable value of the crediting reductions in GHG emissions associated with each megawatt-hour of purchased electricity, the market provides a standardized reference value that makes it comparatively simple for large numbers of electricity users to participate in GHG mitigation and be rewarded at a known, predictable rate. The members who elect this option know in advance precisely how many tons of $CO_2$ emission allowances they receive (or must surrender) if they can surpass (or fail to achieve) the standardized reduction schedule.

This standardized, predictable system enhances the ability to test the electricity reduction commitment mechanism. By doing this, the provision allows a much broader range of entities to participate in GHG mitigation, even if they do not directly release significant amounts of GHGs through their own combustion of fuels or industrial processes. This mechanism provides a standard system whereby large commercial buildings (e.g., office buildings, shopping malls, government buildings, electricity-intensive manufacturing operations, and, conceivably, groups of small commercial utilities and households), can participate in a GHG reduction and trading program.

Another exemplary embodiment includes a method for integrating renewable energy certificates (RECs) markets into a greenhouse gas emissions trading market. The RECs markets are emerging in various states, provinces and countries as a means for cost-effectively increasing the quantity of electric power produced through environmentally preferable methods. Laws in multiple states (e.g., Texas and Nevada) require increasing amounts of electricity to be generated using low or zero-emission systems, such as wind energy. The RECs laws typically set a quantified overall objective (e.g. 5% of all electricity production for the year 2003) for renewable energy production and allows those who produce electricity from renewable energy systems in an amount above the mandated level to earn tradable certificates indicating they have exceeded the regulatory goal. If another electricity producer cannot achieve the legislated objective it can remain in compliance with the legislated mandate by acquiring RECs from the electricity producer that exceeded the legislated mandate. For example, the legislative mandate could require Company A and Company B to each to produce 1,000 megawatt-hours of electricity using specified renewable energy systems. If Company A in fact produces 1,200 megawatt-hours of electricity using renewable systems, it would earn 200 megawatt-hours worth of RECs. If Company B produces 800 megawatt-hours of electricity using renewable systems, it must acquire 200 megawatt-hours worth of RECs to achieve compliance with the legislative mandate (by producing 800 mw of renewable energy on its own and by acquiring 200 mw worth of RECs to demonstrate ownership of the other 200 mw of renewable energy production).

The market can allow its members to include electricity purchases as a supplemental reduction objective. For example, the market rules can provide the following: "Electricity produced using specified renewable energy sources can be treated as zero emission electricity by a Member that elects to opt-in electricity purchases. Each Member that elects to opt-in electricity purchases may exclude from its Electricity Purchases Baseline and Periodic Electricity Purchase Reports electricity acquired from market-specified Renewable Electricity Production Systems, provided the Member provides documentary evidence that the electricity is produced solely for the Member or is otherwise dedicated to the Member. Electricity produced by the following Renewable Electricity Production Systems shall qualify under this provision: solar; hydropower; wind; renewable fuels, which, for purposes of market are: wood, wood wastes and wood-derived fuels; agricultural residues and grasses; landfill and agricultural methane; and ethanol (bioalcohol). Documentary evidence that electricity is produced solely for the Member or is otherwise dedicated to the Member can consist of copies of power plant ownership documents, power purchase contracts, and, as specified by the Market Executive Committee, certain renewable energy certificates."

By allowing members to use renewable energy certificates as a means of documenting that a portion of their electricity purchases are acquired from renewable energy systems, the market explicitly introduces a linkage between the greenhouse gas and RECs markets. This introduces an additional source of flexibility to members to achieve the electricity purchase reduction commitments via a systemic increase in production of electricity by renewable energy systems as evidenced by the Member's acquisition and presentation to the market of RECs. Incorporating this mechanism into the market architecture also provides another potential source of financing for new electricity production systems based on renewable energy sources.

Consistent with the economic growth provision described with reference to FIGS. 5 and 6, the maximum recognized increase in purchased power is, for example, 2% above baseline in 2003 and 2004, and 3% above baseline in 2005 and 2006. Without the economic growth provision limiting maximum required purchases, the maximum liability associated with participation in the market would be unknown. This mechanism allows potential participants to know, in advance with certainty, the maximum quantity of allowances they may have to purchase to achieve compliance with the annual electricity purchase reduction commitments, as well as the maximum quantity of sales of emission allowances they may be able to undertake.

Uncertainty as to how and how much to credit reduction in electric power purchases impedes adoption of reduction objectives and the end-use efficiency technologies and management methods that can contribute to mitigation of GHG emissions. By adopting standard greenhouse gas emission allowance quantities for reductions in electricity purchases in the U.S., Canada and Mexico, the market encourages participation in this mechanism and broadens the base of entities that can contribute to GHG mitigation via reductions in electricity purchases.

Members are responsible for emissions from jointly owned facilities in proportion to the member's ownership equity share, subject to the following exceptions. Members not primarily engaged in electric power production have the option to exclude from their emissions baseline and emission reports emissions from facilities in which the member's equity ownership share is less than 20%. Exceptions can be made on a case-by-case basis if a member's ownership share is less than 50% and emissions data from the jointly owned facility is not accessible to the member.

Entities primarily engaged in electric power production have the option to exclude from their emissions baseline and emission reports emissions from facilities in which the member's equity ownership share is both less than 20% and represents less than 25 megawatts of generating capacity.

Many large industrial and energy facilities are owned by multiple entities. These multiple owners often jointly invest in a facility as a means of spreading financial risk or exploiting the special business capabilities or locational advantage provided by one of the joint owners. The specific provisions for apportioning GHG emissions in the market for jointly owned facilities takes into consideration: the logic of employing a pro data ownership approach; the desire to include a large proportion of each firms emissions, the importance of including major emission sources as a primary objective; the reality that minority owners of a facility may not have ready access to operational data needed to calculate emissions of a facility.

At the same time, by implicitly allowing a member to opt-in emissions from facilities in which it owns a relatively small equity share, these provisions encourage members to examine the possibility that such facilities may offer low-cost emission reductions. This flexibility encourages members to identify such low cost GHG reduction options, realize them and bring them into the market, which would enhance the overall cost effectiveness of the GHG emission reductions achieved through the market.

Each exchange member can be allowed annually to exempt a quantity of emissions that is equivalent to the emissions of a 500 megawatt capacity natural gas combined cycle electricity generating plant operated at 55% of capacity and having a heat rate of 7,000 btu/mwh. The exempt emissions cannot exceed emissions from the new facility or facilities. All new unit emissions above this level are included as part of the member's annual emissions. As such, members who build new facilities are not penalized in light of the fact that new facilities are typically more efficient (i.e. emit less GHG per unit of electricity produced) than existing facilities.

This provision reflects both an environmental rationale and a practical equity consideration. Development of new, higher-efficiency production facilities offers a means of fulfilling demand for products while producing less GHG emissions per unit of production. In addition, members may have been constructing such plants prior to the initiation of the market design phase. This provision establishes a limited exemption for emissions from new facilities, thereby removing or reducing the penalty that might have been in place if emissions from such facilities were required to be mitigated under the market rules.

Figure 11:
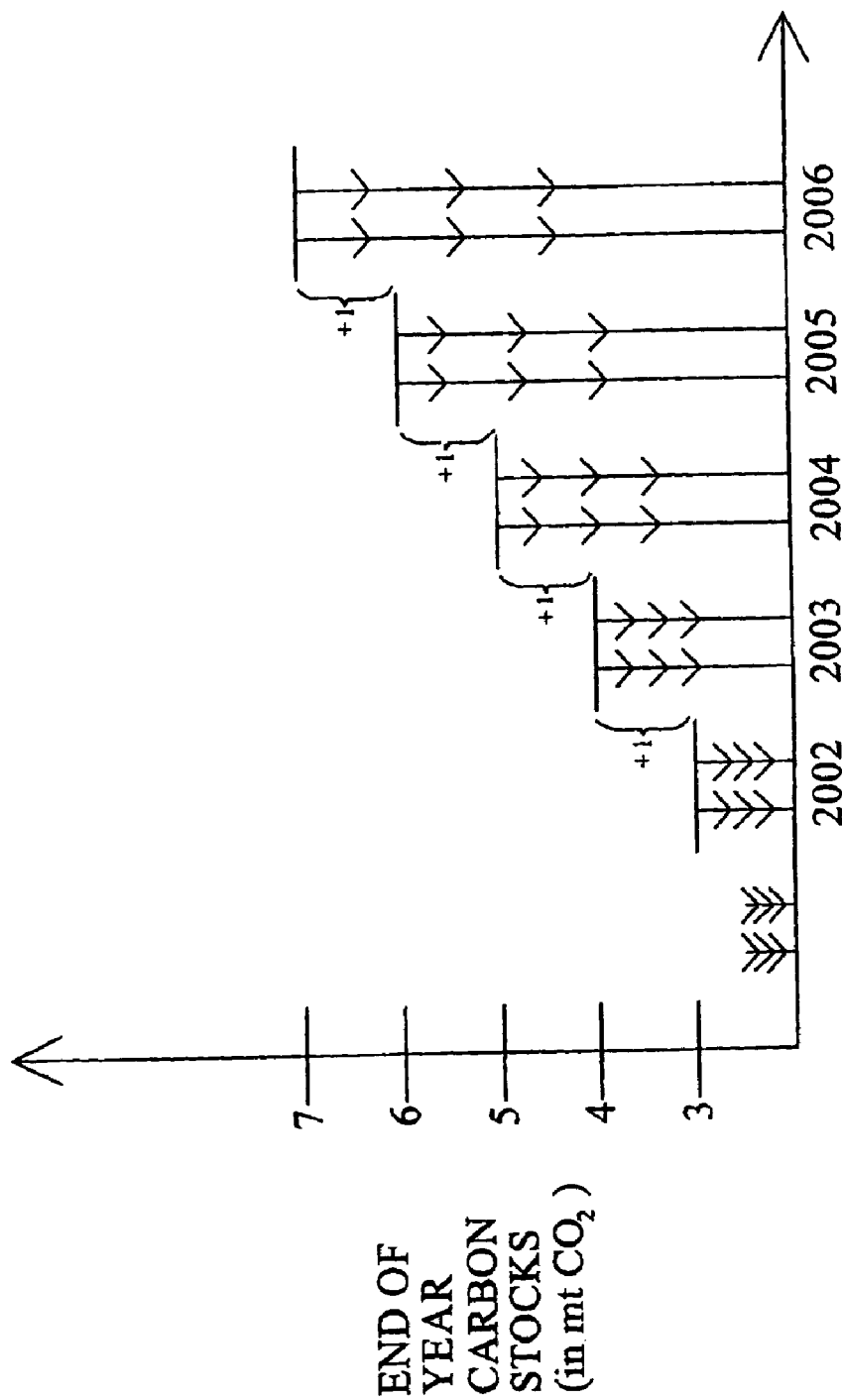
FIG. 11 is a graph of exemplary forestry offsets based on carbon storage.

FIG. 11 illustrates a graph depicting exchange forestry offsets (XFOs) based on carbon storage. Similar to methane combustion projects, qualifying reforestation and afforestation projects can be issued Exchange Forestry Offsets on the basis of increases in tons of $CO_2$ equivalent of carbon storage realized. Project eligibility, project baselines, quantification, monitoring and verification protocols can be specified using the market. In the graph, XFOs of +1 are earned each year as end of year carbon stocks increase.

Figure 12:
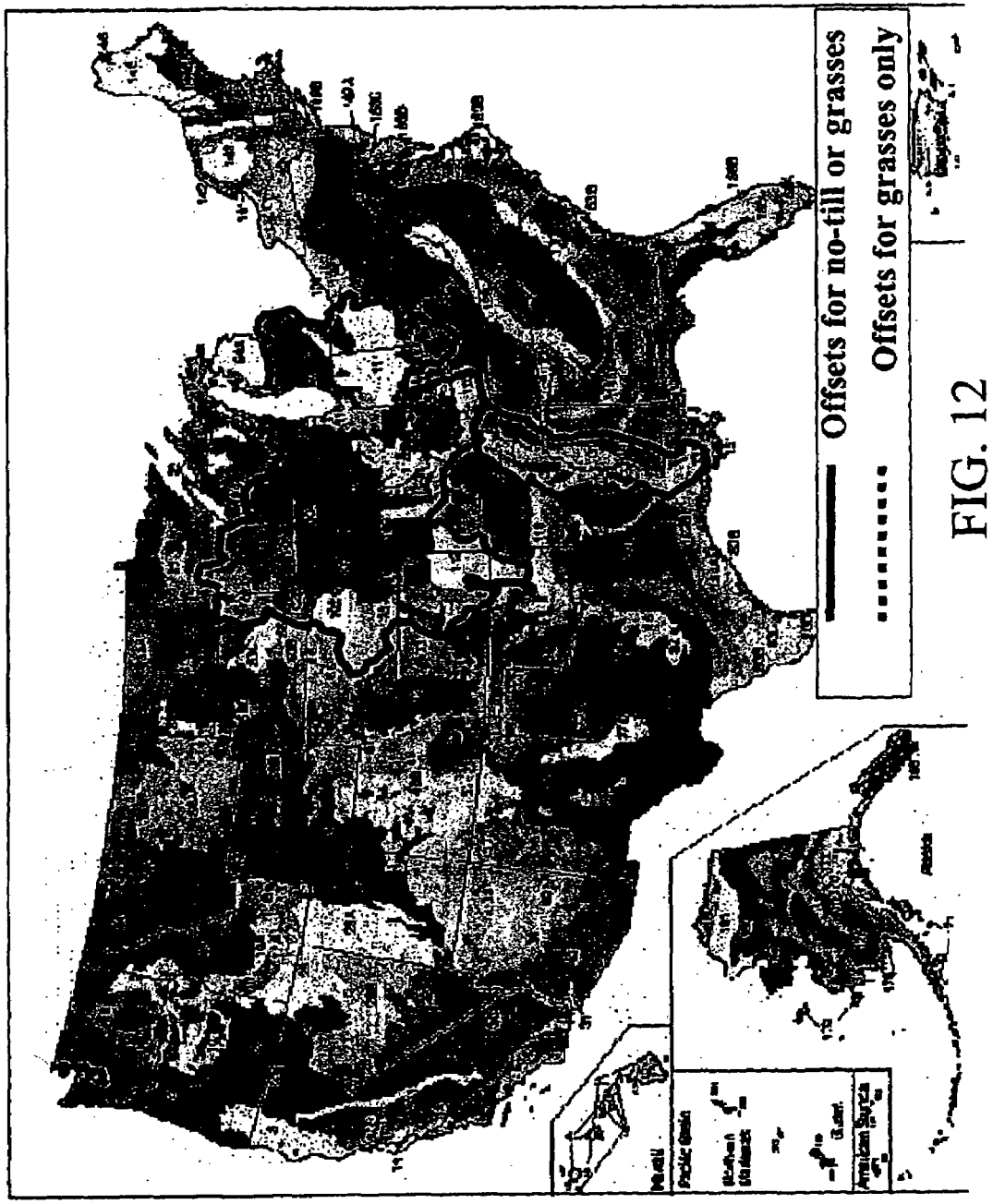
FIG. 12 is an exemplary map of agricultural soil offsets based on geographic region.

FIG. 12 illustrates a map of agricultural soil offsets based on geographic region. Offset issuance quantities for agricultural soil can standardize participation of GHG emissions mitigation via soil carbon sequestration. Soil carbon sequestration is realized when farmers or other individuals do not significantly disturb the soil surface through tillage and release carbon accumulated therein. In an exemplary embodiment, certified soil offsets can be issued annually for agricultural soil carbon sequestration activities in designated states, counties and parishes in the U.S. Midwest and Mississippi Delta regions. As an example, Exchange Soil Offsets can be issued at a rate of 0.5 metric tons $CO_2$ per acre per year in cases where farmers commit to qualifying continuous no-till or low-till in the designated locations. Exchange Soil Offsets can be issued at a rate of 0.75 metric tons $CO_2$ per acre per year in cases where farmers commit to maintain sequestration associated with grass plantings in the designated locations.

The market allows for the cost-effective incorporation of carbon sequestration by a large number of agricultural producers despite uncertain site-specific sequestration rates and high costs of measuring soil carbon changes.

Figure 13:
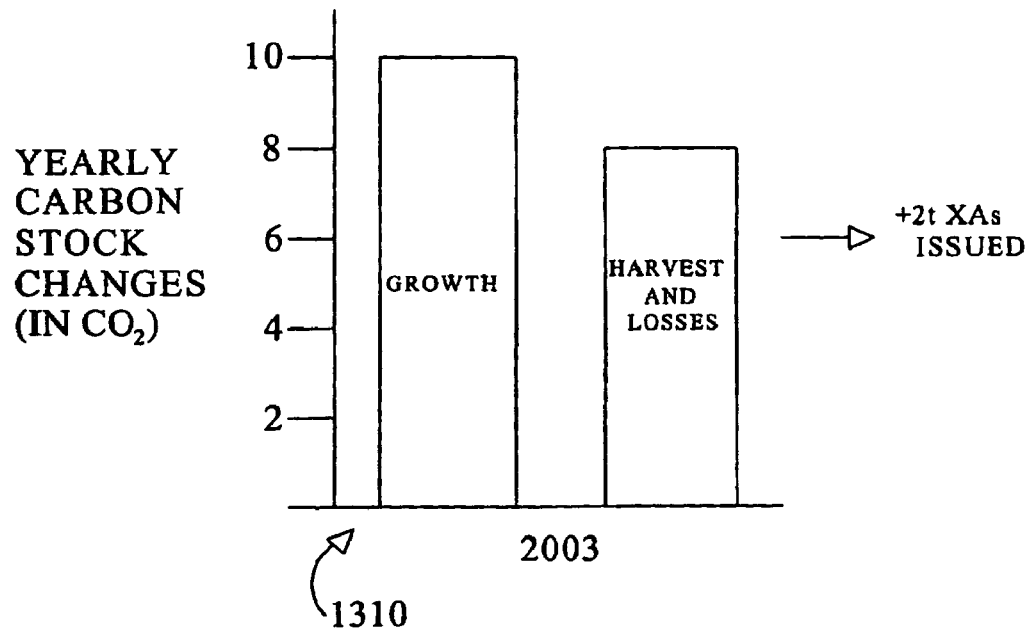
FIG. 13 is a diagrammatic representation of an exemplary issuance of greenhouse gas emission allowances upon increases in qualifying carbon stocks.
Figure 13:
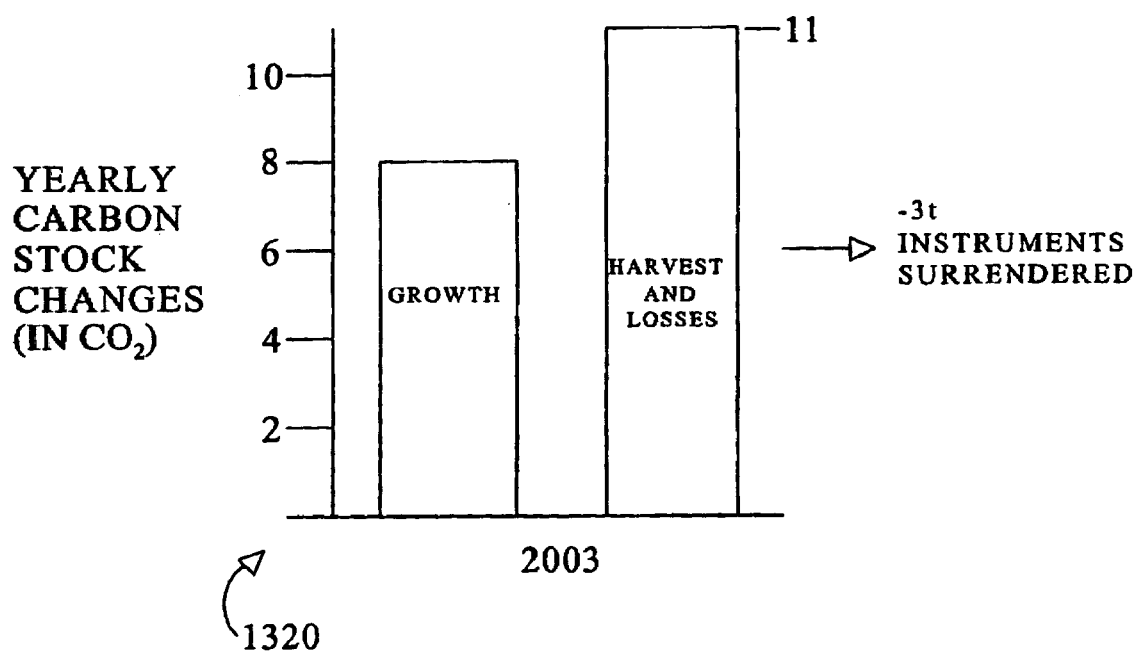

FIG. 13 illustrates the issuance of greenhouse gas emission allowances upon increases in qualifying carbon stocks by members of the market in the forest products sector. A graph 1310 depicts yearly carbon stock changes. The graph 1310 shows growth of carbon stock in 2003 as 10 metric tons $CO_2$ and harvest and other losses as 8 metric tons $CO_2$. As such, there is a +2 ton net change and XAs are issued to the member.

A graph 1320 shows growth of carbon stock in a particular year to be 8 metric tons $CO_2$ and harvest and other losses as 11 metric tons $CO_2$. In this case, the member is liable for a −3 net change and must surrender 3 tons of CFIs.

Quantification of changes in carbon stocks held in above-ground biomass are based on standardized models and sampling procedures to be used by all members in the forest products sector. The calculation of changes in carbon stocks can be adjusted to reflect acquisition or disposition of forest land.

In an exemplary embodiment, the maximum amount of net reductions in carbon stored in above-ground biomass on company land recognized is limited to 3% of each member's emission baseline during a first year, such as 2003, 4% of its baseline during 2004, 6% of its baseline during 2005 and 7% of its baseline during 2006. The maximum recognized quantity of net increases in carbon stored in above-ground biomass is limited to 3% of the member's emission baseline during a first year, such as 2003, 4% of its baseline during 2004, 6% of its baseline during 2005 and 7% of its baseline during 2006. Net sales and banking of Exchange Allowances by members are also subject to limits described below.

Increased carbon sequestration associated with changes in carbon stocks due to forest management activities offer an important GHG mitigation option and should be recognized and credited (or debited if such changes cause a reduction in stored carbon). Preferably, greenhouse gas emission allowances are issued in an amount reflecting net increases in stored carbon during the 1-4 years time period. These members must surrender XAs, XOs or XEs on an annual basis in an amount reflecting net decreases in stored carbon during the four year time period. The calculation of changes in carbon stocks can be adjusted to reflect acquisition or disposition of forest land.

Figure 14:
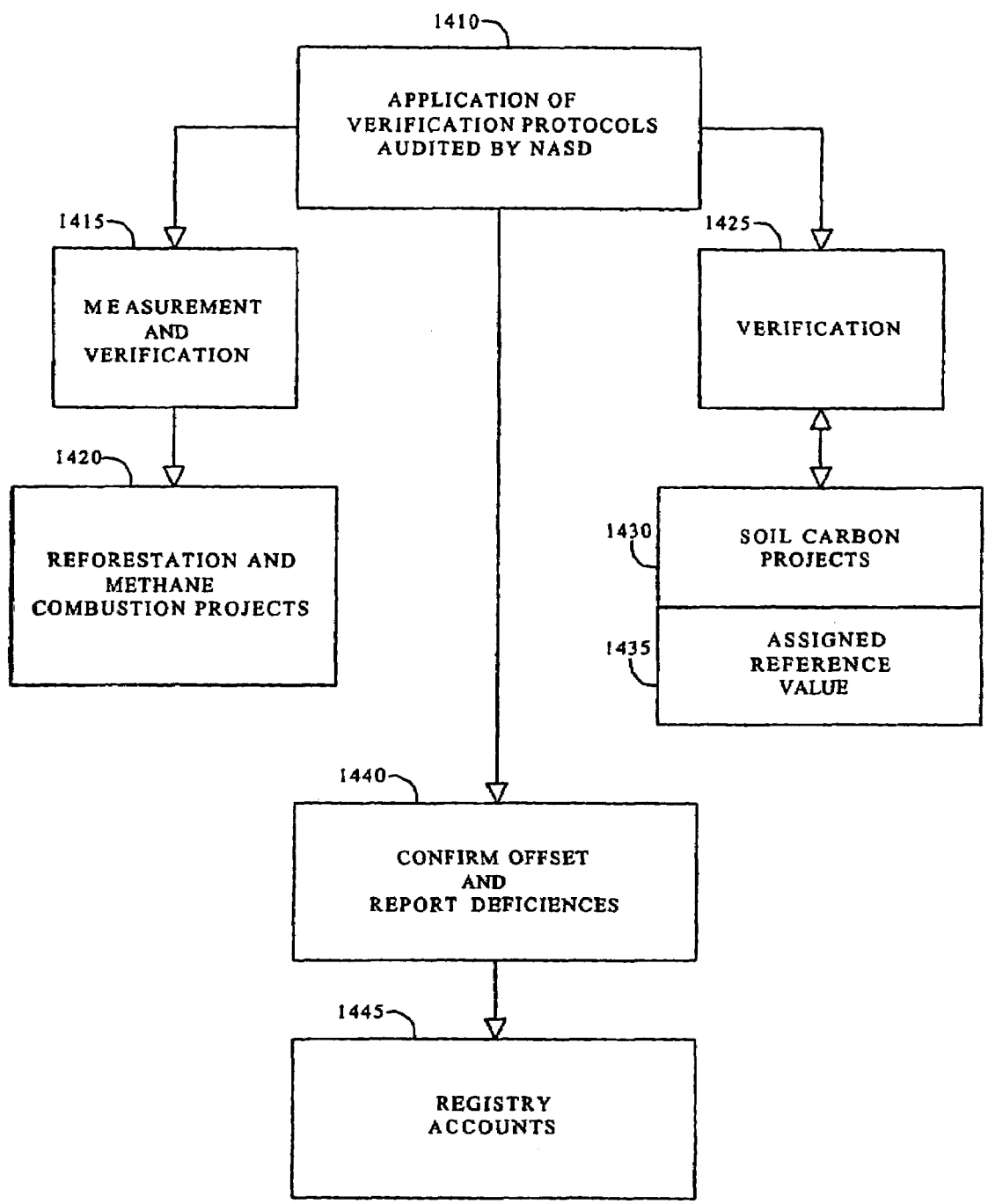
FIG. 14 is a diagrammatic representation of an exemplary offset verification process.

FIG. 14 illustrates an offset project verification process. Additional, fewer, or different operations can be performed in the process, depending on the particular embodiment. In an operation 1410, NASD audits can be performed using protocols. Independent measurement and verification can be performed in an operation 1415 on reforestation and methane combustion projects 1420.

In an operation 1425, independent verification is performed on soil carbon projects 1430 that contracted practices are undertaken. A reference value can be assigned in operation 1435. The offset project tonnage can be confirmed and deficiencies reported in an operation 1440. Confirmed offsets are communicated to registry accounts of individual projects and aggregators in an operation 1445.

The market can specify project eligibility, project baselines, quantification, monitoring and verification protocols. This feature helps to satisfy the need for a predictable, low transaction cost protocol that provides to farmers, in advance of their decision to commit to a contract to provide carbon sequestration services, precise information on the quantity of offsets they earn per acre per year for eligible soil carbon sequestration practices.

By way of another example, Exchange Emission Reductions can be issued to qualifying projects undertaken in Brazil or other countries. Qualifying projects include: reforestation and/or assisted forest regeneration; avoided deforestation together with reforestation and/or assisted forest regeneration; fuel switching; landfill methane destruction; and renewable energy generation from solar, wind, small hydroelectric and biomass systems.

Exchange Early Action Credits (XEs) can be issued to certain projects previously undertaken. To qualify, projects must be: off-system; originally undertaken or financed by members; direct emissions reductions or involve sequestration; clearly owned by the members; measured; and verifiable. By establishing specifications for this provision, it is possible to define which actions undertaken before activation of its GHG market are eligible to earn early action credits. This standard is of particular value as many legislative proposals worldwide that propose GHG limits have recognized the importance (in terms of equity and provision of incentives to act early) of including an early-action crediting provision.

By way of example, Exchange Early Action Credits can be given to the following project types that meet the eligibility criteria: reforestation, afforestation and avoided deforestation; landfill methane destruction in the U.S.; fuel switching and other energy related U.S.I.J.I. projects. Exchange Early Action Credits are issued on the basis of mitigation tonnage realized by the qualifying project.

Numerous legislative proposals in the U.S. and elsewhere have proposed the general concept of crediting "early action". The rationale for this concept is to encourage early action to mitigate GHGs by removing an incentive to postpone action. It is sometimes argued that entities that could reduce GHG emissions in the near-term in fact refrain from doing so because they would lose the opportunity to be credited for such reductions if they are realized prior to enactment of legislation or other actions that cause the emergence of a GHG reduction and trading system. By establishing precedent that demonstrates that "early" action can be effectively credited in an organized GHG reduction and trading system, this provision may stimulate GHG mitigation actions that might otherwise be postponed or never undertaken.

A limited number of market constraints are employed in order to assure that emission mitigation under the market reflects a balance of emission reductions at member facilities and reductions from off-system projects, and to prevent market instability and price congestion. The market does not endorse the imposition of limits on trading or on the use of offsets in large scale GHG trading systems that may emerge a market created by government regulation.

Net sales of Exchange Allowances by any single member are limited to 0.5% of the program-wide emissions baseline, apportioned over 2003-2006 according to the schedule in Table 2 below.

TABLE 2

| XA Vintage | Net Exchange Allowance (XA) sales limit: percent of program-wide baseline emissions that can be sold by a single firm for each XA vintage |
|---|---|
| 2003 | 0.05% |
| 2004 | 0.10% |
| 2005 | 0.15% |
| 2006 | 0.20% |

Total: 0.50% of program-wide baseline emissions

In an exemplary embodiment, the market can include "super reductions" which can be sold to non-members that may seek to purchase emission reductions that are registered in the context of a rules-based program. These "super reductions" reflect cases where members reduce emissions beyond the maximum reductions recognized as tradable, as per market rules. Additionally, "super reductions" may be usable in pilot markets that may be established subsequent to 2006.

By way of example, during a first year, program-wide use for compliance of Exchange Emission Offsets is allowed in an amount equal to 0.5% of the total program-wide baseline emissions. Exchange Early Action Credits may be used for compliance starting in a second year. During subsequent years after the first year, program-wide use of Exchange Emission Offsets plus Exchange Early Action Credits is allowed in an amount equal to 4.5% of the total program-wide baseline emissions. As such, limitations on the use of Exchange Offsets plus Early Action Credits are adjusted in a predictable manner, and in proportion to expansion of the market due to new entrants (and contraction due to disposition of emission sources by members).

Such a provision assures that the majority of GHG mitigation in the market occurs at member facilities, maintaining market balance, diversity and environmental credibility while allowing development and use of project-based offsets and implementing a method for crediting early action. By limiting the allowed use of Exchange Emission Offsets plus Exchange Early Action Credits, this provision establishes that at least half of the overall GHG mitigation realized by member must come from reductions in the emissions released by their own facilities.

By limiting the proportion of CFIs produced by prior emission mitigation projects used in compliance in the market to no more than 25% of the program-wide emission reduction, the market effectively requires that 75% of the reductions come from mitigation actions that occur concurrently or in the future, (or occurred recently e.g. via mitigation projects occurring after a certain date). This provision also helps to maintain market balance and diversity of mitigation efforts.

The total program-wide quantity of Exchange Early Action Credits used for compliance during years subsequent to the first year preferably does not exceed 50% of the total quantity of Exchange Offsets plus Exchange Early Action Credits used for compliance. Total allowed use for compliance of Exchange Offsets during the first year, and Exchange Emission Offsets plus Exchange Early Action Credits during subsequent years are escalated if program-wide emissions rise above baseline levels. The proportional escalation mechanism reflects the extent to which program-wide emissions exceed program-wide baseline emission levels. Advantageously, this mechanism establishes a formulae predictable process that automatically loosens market efficiency provisions as demand rises.

For each member, total net sales plus use for compliance of Exchange Offsets (e.g. Landfill Offsets) produced by facilities that it owns and/or operates are allowed in an amount equal to no more than 0.5% of the total program-wide baseline emissions, apportioned over certain years. By way of example, limits can be as indicated in Table 3.

TABLE 3

| XO Vintage | Total net sales plus use for compliance of XOs generated from member's owned and operated facilities, by XO vintage |
|---|---|
| 2003 | 0.05% |
| 2004 | 0.10% |
| 2005 | 0.15% |
| 2006 | 0.20% |
| | Total: 0.50% of program-wide baseline emissions |

Such a feature avoids market imbalance, price congestion and potential for market dominance by a single seller of Exchange Offsets or a small group of sellers by constraining the quantity of sales any single firm can make. Certain individual members may be in a position to sell large quantities of Exchange Offsets. As is the case with any limited-scale and limited-coverage market, should any single member or small group of members be allowed to sell without limit, the market could become imbalanced and subject to price congestion. Similarly, unrestrained ability to sell could cause a single-firm to achieve a dominant status of the sell-side of the market, which would be damaging to market competition.

Allowed sales plus use for compliance by a single member under this provision can be escalated proportionately if program-wide emissions rise above baseline levels. The escalation mechanism reflects the extent to which program-wide emissions exceed program-wide emission baseline levels. Advantageously, this mechanism establishes a formulae predictable process that automatically loosens market efficiency provisions as demand rises.

By way of summary, system 10 (FIG. 1) and/or system 100 (FIG. 3) (again, collectively referred to herein as "the market") provide an electronic mechanism for hosting greenhouse gas commodity trading. It provides participants with a central location that facilitates trading, publicly reveals price information, and contributes to the broad objectives of the emission reduction plan. The market reduces the cost of locating trading counterparties and finalizing trades, an important benefit in a new market. The market may also be used as the platform for conducting the periodic auctions. The market could host trading in standardized contracts that, for example, provide a uniform trade size, pricing terms and payment requirements. The market may have the following core features: low cost to users, easy-to-use for participants, allow for real-time trading and price information, and readily interface with the registry accounts of participants in the commodity market.

The market overcomes many of the shortcomings and disadvantages of conventional emissions trading programs. For example, the absence of a complete, standardized system for defining and trading greenhouse gas reductions introduces high transaction costs and impedes the widespread initiation of action to reduce greenhouse gas emissions among private, non-profit and public sector entities. The market provides a method for greenhouse gas reduction through a commodity based trading program. Unlike ad hoc or unstandardized emissions trading programs, the market provides a commodity-based exchange that facilitates capital flows to environmental protection by employing a central electronic trading mechanism coupled with a means of guaranteeing receipt of payment and delivery of traded Carbon Financial Instruments even if a counter-party fails to perform.

Another shortcoming of conventional systems is how to facilitate participation in greenhouse gas reduction efforts by multiple sectors in multiple countries, thus advancing environmental progress and enhancing the prospects for cost effectiveness by allowing reductions to occur in a wide range of organizations.

The standardized emission reduction schedule applied in the capped trading system described herein establishes a common, proportionate system under which all exchange members know both their emission reduction objectives and the maximum liability they may face in meeting such objectives.

Another shortcoming of conventional systems is the lack of common rules, standards, protocols and methods which impedes large-scale participation in GHG mitigation efforts and limits the ability to realize mitigation at low cost. Preferably, the market includes a structured market design and standardized environmental objective that allows numerous participants to mitigate greenhouse gases on a common schedule. This reduces transaction costs and facilitates broader action and ease of transacting and introduces a mechanism for allowing efficient flow of financial resources to the mitigation of greenhouse gases.

Use of a standardized, proportional emissions reduction schedule simplifies addition of new members as the emission reduction objective of each existing member is not altered when new participants join the exchange. The capability of potential participants to join the exchange is continually changing as the strategic benefits of joining are better appreciated, and as the required skills base is expanded. Starting with a limited-scale pilot market allows for near-term demonstration of the exchange. In addition, the ability to test and refine methods and systems is enhanced by having limited scale.

Expansion of membership automatically causes an expansion of the trading opportunities for members and offset providers based on pre-set formulae, while also providing the mechanisms to maintain market balance.

Unlike any other existing emissions trading program, use of a "live," electronic trading platform allows members and participants to continuously view bids, offers and transaction prices and volumes. Continuous price discovery enhances the ability of members to identify the least-cost methods for achieving compliance with the reduction commitments.

Advantageously, public price discovery informs the development of private and legislative actions to mitigate greenhouse gases. Currently, there is no systematic method for making public prices from greenhouse gas emission reduction trades. Thus, the formation of private and legislative actions suffers from the absence of critical information needed to establish economically rational actions. Without price information, the ability to develop GHG reduction action plans is impeded because cost-benefit analysis is conducted with severely limited information on mitigation costs.

Lack of a common, rules based framework in conventional systems impedes economically efficient use of emission mitigation resources. The market embodied in the system 10 and/or the system 100 allows flexibility in the methods, location and timing of emission reductions so that greenhouse gas emissions can be reduced cost effectively.

With conventional systems, the action to cut and trade greenhouse gases is greatly impeded by high transaction costs. System 10 and/or system 100 facilitates trading with low transaction costs. A rules-based program, a central trading platform, delivery and payment guarantees and low transaction costs implemented in system 10 and/or system 100 greatly reduce the impediments to trading, thus allowing all market participants to exploit the opportunity to realize economic gains from trading. Such features help assure that greenhouse gas emission reductions are both undertaken more broadly and are realized at the lowest possible cost.

This detailed description outlines exemplary embodiments of an emissions reduction and trading system and method. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

Systems can be included within the market for performing a variety of functions. For example, a system can be included to designate individual employees of market members, associate members, and participant members as authorized traders of such members. Another system can be included to screen all entities that desire to become market members, associate members, and participant members on the basis of financial standing and business stability. Yet another system allows traders to elect to utilize market provided trade negotiation and clearing mechanisms or, alternatively, to negotiate trades in a private, bilateral fashion.

Advantageously, the systems and methods described here enable the creation and operation of a greenhouse gas emissions market with reduced transaction costs. The minimization of transactions costs may be a result of one or more of a variety of different factors. These factors include the standardizing of definitions of included emissions and opt-in provisions; allocating ownership of emissions in cases of jointly owned facilities; defining emission baselines; defining tradable Carbon Financial Instruments; defining Early Action Credits; emissions monitoring methods; offset project definitions (including formulae) and sizes and aggregation; market constraints; the registry; the trading platform; and the clearing system.

In some embodiments, a computer system is used for the implementation of these systems and markets which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

FIG. 15 schematically illustrates another exemplary embodiment of an emissions reduction trading system. As shown in FIG. 15, the illustrated system 1500 includes one or more client digital data processing devices 1506 ("client"), one or more server digital data processing devices 1510 ("server"), and one or more databases 1534. The client 1506, the server 1510, and the database 1534 communicate using one or more data communications networks 1512 ("networks"). In FIG. 15, the features in a digital data processing device are shown as residing in the client 1506. Those of ordinary skill in the art will understand that one or more of the features of the client 1506 can be present in the server 1510.

As described further herein, the emissions reduction trading system 1500 can compute emissions numbers (i.e., amounts of GHG emissions or emission reduction equivalents), compliance CFIs, and/or other related parameters for members and associate members (collectively referred to hereinafter as "members") based on the members' consumption of energy sources. Additionally, the emissions reduction system 1500 can administer the guarantee mechanism (e.g., 16 in FIG. 1), the trading host/platform (e.g., 18 in FIG. 1), the clearing system (e.g., 106 in FIG. 3), and the other mechanisms and systems previously described herein with respect to FIGS. 1-14.

Generally, references herein to a "client" and a "server" are used to differentiate two communicating devices and/or sets of processor instructions. References herein to a client and/or a server can thus be understood to be references to communications originating from a client and/or a server as these terms are understood by those of ordinary skill in the art. Such communications can be based on or otherwise initiated from one or more input devices (e.g., a keyboard, a stylus, a mouse, etc.) controlled by a user. Also, references herein to a client and/or a server can thus be understood to include one or more processor-controlled devices that act in a client-server (i.e., request-response) model, in which the client and the server can reside on the same processor-controlled device, and in which, based on perspective, the client can act as a server, and the server can act as a client.

As shown in the system 1500 of FIG. 15, a user 1502 (e.g., a member or environmental benefactor) desiring to compute GHG emissions or emission reduction equivalents can execute one or more software application programs 1504 (such as, for example, an Internet browser and/or another type of application program capable of providing an interface to a GHG emissions computation program) residing on the client 1506 to generate data messages that are routed to, and/or receive data messages generated by, one or more software application programs 1508 (e.g., a GHG emissions or emission reduction equivalents computation program) residing on the server 1510 via the network 1512. A data message includes one or more data packets, and the data packets can include control information (e.g., addresses of the clients and the servers 1506, 1510, names/identifiers of the software application programs 1504, 1508, etc.) and payload data (e.g., data relevant to compute GHG emissions, such as a request 1548 that includes consumption data and output data 1562 that includes the thusly computed GHG emissions).

The software application programs 1504 include one or more software processes (e.g., a calculation process/engine) executing within one or more memories 1518 of the client 1506. Similarly, the software application programs 1508 include one or more software processes executing within one or more memories of the server 1510. The software application programs 1508 include one or more sets of instructions and/or other features that enable the server 1510 to compute GHG emissions or emission reduction equivalents, compliance CFIs, and/or other related parameters. For example, as described herein, the software application program 1508 include instructions for processing consumption data 1536*a* to generate GHG emissions data 1536*b* and CFI data 1536*c*. Additionally, in some embodiments, the software application programs 1508 include one or more sets of instructions and/or other features that can enable the server 1510 to administer the guarantee mechanism (e.g., 16 in FIG. 1), the trading host/platform (e.g., 18 in FIG. 1), the clearing system (e.g., 106 in FIG. 3), and the other mechanisms and systems previously described herein with respect to FIGS. 1-14. The software application programs 1504, 1508 can be provided using a combination of built-in features of one or more commercially available software application programs and/or in combination with one or more custom-designed software modules. Although the features and/or operations of the software application programs 1504, 1508 are described herein as being executed in a distributed fashion (e.g., operations performed on the networked client and servers 1506, 1510), those of ordinary skill in the art will understand that at least some of the operations of the software application programs 1504, 1508 can be executed within one or more digital data processing devices that can be connected by a desired digital data path (e.g. point-to-point, networked, data bus, etc.).

The digital data processing device 1506, 1510 includes a personal computer, a computer workstation (e.g., Sun, Hewlett-Packard), a laptop computer, a server computer, a mainframe computer, a handheld device (e.g., a personal digital assistant, a Pocket Personal Computer (PC), a cellular telephone, etc.), an information appliance, and/or another type of generic or special-purpose, processor-controlled device capable of receiving, processing, and/or transmitting digital data. A processor 1514 refers to the logic circuitry that responds to and processes instructions that drive digital data processing devices and includes, without limitation, a central processing unit, an arithmetic logic unit, an application specific integrated circuit, a task engine, and/or combinations, arrangements, or multiples thereof.

The instructions executed by a processor 1514 represent, at a low level, a sequence of "0's" and "1's" that describe one or more physical operations of a digital data processing device. These instructions can be pre-loaded into a programmable memory (e.g., an electrically erasable programmable read-only memory (EEPROM)) that is accessible to the processor 1514 and/or can be dynamically loaded into/from one or more volatile (e.g., a random-access memory (RAM), a cache, etc.) and/or non-volatile (e.g., a hard drive, etc.) memory elements communicatively coupled to the processor 1514. The instructions can, for example, correspond to the initialization of hardware within the digital data processing devices 1506, 1510, an operating system 1516 that enables the hardware elements to communicate under software control and enables other computer programs to communicate, and/or software application programs 1504, 1508 that are designed to perform operations for other computer programs, such as operations relating to computing GHG emissions and compliance CFIs. The operating system 1516 can support single-threading and/or multi-threading, where a thread refers to an independent stream of execution running in a multi-tasking environment. A single-threaded system is capable of executing one thread at a time, while a multi-threaded system is capable of supporting multiple concurrently executing threads and can perform multiple tasks simultaneously.

A local user 1502 can interact with the client 1506 by, for example, viewing a command line, using a graphical and/or other user interface, and entering commands via an input device, such as a mouse, a keyboard, a touch sensitive screen, a track ball, a keypad, etc. The user interface can be generated by a graphics subsystem 1522 of the client 1506, which renders the interface into an on- or off-screen surface (e.g., on a display device 1526 and/or in a video memory). Inputs from the user 1502 can be received via an input/output (I/O) subsystem 1524 and routed to a processor 1514 via an internal bus (e.g., system bus) for execution under the control of the operating system 1516.

Similarly, a remote user (not shown) can interact with the digital data processing devices 1506, 1510 over the network 1512. The inputs from the remote user can be received and processed in whole or in part by a remote digital data processing device collocated with the remote user. Alternatively and/or in combination, the inputs can be transmitted back to and processed by the local client 1506 or to another digital data processing device via one or more networks using, for example, thin client technology. The user interface of the local client 1506 can also be reproduced, in whole or in part, at the remote digital data processing device collocated with the remote user by transmitting graphics information to the remote device and instructing the graphics subsystem of the remote device to render and display at least part of the interface to the remote user. Network communications between two or more digital data processing devices can include a networking subsystem 1520 (e.g., a network interface card) to establish the communications link between the devices. The communications link interconnecting the digital data processing devices can include elements of a data communications network, a point to point connection, a bus, and/or another type of digital data path capable of conveying processor-readable data.

In one illustrative operation, the processor 1514 of the client 1506 executes instructions associated with the software application program 1504 (including, for example, runtime instructions specified, at least partially, by the local user 1502 and/or by another software application program, such as a batch-type program) that can instruct the processor 1514 to at least partially control the operation of the graphics subsystem 1522 in rendering and displaying a graphical user interface (including, for example, one or more menus, windows, and/or other visual objects) on the display device 1526.

The network 1512 can include a series of network nodes (e.g., the client and the servers 1506, 1510) that can be interconnected by network devices and wired and/or wireless communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from an originating node to a server node regardless of dissimilarities in the network topology (e.g., bus, star, token ring), spatial distance (e.g., local, metropolitan, wide area network), transmission technology (e.g., transfer control protocol/internet protocol (TCP/IP), Systems Network Architecture), data type (e.g., data, voice, video, multimedia), nature of connection (e.g., switched, non-switched, dial-up, dedicated, or virtual), and/or physical link (e.g., optical fiber, coaxial cable, twisted pair, wireless, etc.) between the originating and server network nodes.

FIG. 15 shows processes 1528, 1530, 1532, and 1550. A process refers to the execution of instructions that interact with operating parameters, message data/parameters, network connection parameters/data, variables, constants, software libraries, and/or other elements within an execution environment in a memory of a digital data processing device that causes a processor to control the operations of the digital data processing device in accordance with the desired features and/or operations of an operating system, a software application program, and/or another type of generic or specific-purpose application program (or subparts thereof). For example, a network connection process 1528, 1530 refers to a set of instructions and/or other elements that enable the digital data processing devices 1506, 1510, respectively, to establish a communication link and communicate with other digital data processing devices during one or more sessions. A session refers to a series of transactions communicated between two network nodes during the span of a single network connection, where the session begins when the network connection is established and terminates when the connection is ended. A database interface process 1532 refers to a set of instructions and other elements that enable the server 1510 to access the database 1534 and/or other types of data repositories to obtain access to, for example, user account data 1536, computation rules 1542, and computation parameters 1544. The accessed information can be provided to the software application program 1508 for further processing and manipulation. An administrative process 1550 refers to a set of instructions and other features that enable the server 1510 to monitor, control, and/or otherwise administer a cash flow computation. For example, the administrative process 1550 can a) maintain and update configuration, runtime, and/or session data for the one or more digital data processing devices 1506, 1510 and/or the software application programs 1504, 1508 executing on the devices 1506, 1510, b) provide buffer management, multi-threaded services, and/or data structure management, c) provide initialization parameters to the digital data processing devices 1506, 1510 and/or the software application programs 1504, 1508, d) manage groups of objects (e.g., groups of data elements stored on the digital data processing devices 1506, 1510 and/or stored or otherwise maintained in the database 1534, groups of software application programs 1504, 1508, groups of members authorized to access software application programs 1504, 1508, groups of licenses, etc.), e) manage relationships between objects in response to messages communicated between the one or more digital data processing devices 1506, 1510, f) provide one or more support services (e.g., encryption/decryption, compression, path routing, message parsing, message format manipulation, etc.) to the digital data processing devices 1506, 1510, and/or g) provide load balancing based on, for example, processor usage/availability, network usage/availability, memory usage/availability, software application program usage/availability, message length, and/or message volume.

Those of ordinary skill in the art will recognize that, although the illustrated processes 1528, 1530, 1532, and 1550 and their features are described as being separate, the illustrated processes and/or their features can be combined into one or more processes. One or more of the illustrated processes 1528, 1350, 1532, and 1550 can be provided using a combination of built-in features of one or more commercially available software application programs and/or in combination with one or more custom-designed software modules.

The databases 1534 can be stored on a non-volatile storage medium or a device known to those of ordinary skill in the art (e.g., compact disk (CD), digital video disk (DVD), magnetic disk, internal hard drive, external hard drive, random access memory (RAM), redundant array of independent disks (RAID), or removable memory device). As shown in FIG. 15, the databases 1534 can be located remotely from the client 1506. In some embodiments, the databases 1534 can be located locally to the client 1506 and/or can be integrated into the client 1506. The databases 1534 can include distributed databases. The databases 1534 can include different types of data content and/or different formats for stored data content. For example, the databases 1534 can include tables and other types of data structures.

Member account data 1536 includes data that identifies the members of system 1500, data that relates to the members' consumption of energy sources, and data that relates to the members' holdings on the market administered by system 1500. Data identifying the members can include the members' names, contact information, login information (e.g., usernames and/or passwords), and/or other similar types of information known to those of ordinary skill in the art. Data relating to the members' consumption of energy sources includes consumption data 1536*a*, GHG emissions data 1536*b*, and CFI data 1536*c*. In most embodiments, such data are associated with time identifiers that identify their vintage, i.e., the time intervals to which they pertain (e.g., consumption data for year 2000). In some of such embodiments, such data may be used, e.g., by the members, the members' exchange, and/or another institution in which the members participate, to track or otherwise monitor the members' consumption of energy sources, GHG emissions, etc. over time. Data relating to the members' holdings on the market may include the members' holdings of CFIs and other related instruments, as previously described herein with respect to FIGS. 1-14.

Consumption data 1536*a* quantify the members' consumption of energy sources. As described further herein, consumption data 1536*a* are determined by and/or otherwise provided by the members to system 1500. Since energy sources may include sources that are consumed during transportation and sources that are consumed independent of transportation, consumption data 1536*a* include transportation data and non-transportation data.

Transportation data occur when a member (e.g., an employee of a member company) travels in a vehicle from one location to another. The vehicle may include an air-based vehicle (e.g., a plane, a helicopter, and a hot-air balloon), a ground-based vehicle (e.g., a train, a bus, a car, and a motorcycle), a water-based vehicle (e.g., a boat and a submarine), or a mixed-media vehicle (e.g., a hovercraft and an amphibious vehicle). In some embodiments, transportation data are represented in terms of vehicle fuel consumed during transportation. The amount of fuel consumed can be determined based on fuel receipts and/or other indicators known to those of ordinary skill in the art. Alternatively and/or in combination, in some embodiments, transportation data are represented in terms of distance traveled by a vehicle. Such transportation data can be converted to fuel consumed based on modifying the transportation data by the fuel efficiency of the vehicle. The fuel efficiency of the vehicle may be the default fuel efficiency of the vehicle (e.g., the efficiency published by the vehicle manufacturer) or a customized fuel efficiency of the vehicle (e.g., the efficiency as determined by a member, e.g., an associate member).

Non-transportation data occur when a member consumes an energy source in an activity other than transportation. Some examples of these activities include, but are not limited to, production of a product at a manufacturing plant and operation of an office building. In some embodiments, non-transportation data are represented in terms of energy source consumed (e.g., coal, electricity, or natural gas consumed during production of a product). The amount of energy source consumed can be determined based on energy source receipts and/or other indicators that are known to those of ordinary skill in the art. Alternatively and/or in combination, in some embodiments, the non-transportation data are represented in terms of an activity-specific intermediate, e.g., an amount of a product produced or consumed, a feedstock consumed during production of a product, and an amount of office space occupied by an office facility. As will be understood by those of ordinary skill in the art, such non-transportation data may be converted to energy sources consumed based on modifying the non-transportation data by an efficiency that is similar to a fuel efficiency in the context of transportation data. For example, an amount of office space can be converted to an amount of electricity consumed based on the product of the amount of office space and a weight (sometimes referred to herein as a consumption factor) that represents a statistical measure of the amount of electricity typically consumed per unit of office space. The statistical measure can be associated with a geographic location (e.g., a country (such as the United States, Mexico, United Kingdom, and Canada), a state, a region, etc.) and can be determined based on publicly available information, such as the information that is described below with respect to emissions factors.

As understood by those of ordinary skill in the art, consumption data 1536*a* may not be readily available to members. For example, consumption data 1536*a* related to operation of a building may not be readily available to members (e.g., tenants) who occupy an amount of office space in the building, due to leasing arrangements, rental arrangements, and/or other factors. Preferably, therefore, as described herein, the disclosed systems and methods provide and/or otherwise utilize emission factors, weights, and other statistical factors that estimate energy consumption in units that are likely to be accessible to members, such as, but not limited to, units of occupied office space, units of distance traveled in a mode of transportation (e.g., per unit of distance traveled in a plane or a jet), etc.

GHG emissions data 1536*b* include GHG emissions that are computed by system 1500 based on consumption data 1536*a*. Usually, the computed GHG emissions are expressed in conventional units, e.g., tons or metric tons of $CO_2$. In some embodiments, however, the computed GHG emissions are expressed in non-conventional units, e.g., units selected by and/or otherwise provided by a member. These non-conventional units can generally be converted to conventional using standard conversion factors.

GHG emissions data 1536*b* also include baseline quantities of GHG emissions and target quantities of baseline emissions that are computed by system 1500 based on the consumption data 1536*a*. As previously described herein with respect to FIGS. 1-14, a rule (e.g., an average) may be applied to a member's GHG emissions over a first time interval to determine the member's baseline quantity of GHG emissions, and another rule (e.g., a percentage reduction) may be applied to the baseline quantity to determine a target amount of GHG emissions for a second later time interval.

The system also advantageously computes emission reduction equivalents through the use of conservation factors for participants such as and in particular for the environmental benefactors. This feature assists members in determining whether or not purchases of additional CFIs are required to achieve the reduction schedule. After calculating GHG emissions and emission reduction equivalents, the member may still exceed its target amount of GHG emissions. Therefore, it may be required to purchase debits from other members or environmental benefactors to be in compliance with its reduction schedule. In addition, the system allows any entity to earn a credit or allowance by conducting environmentally beneficial activities, such as the environmental benefactors or even including the voluntary emission reducers, to calculate a certain emission reduction equivalent for environmentally friendly activities, such as planting trees or reforesting, not disturbing soil for a particular acreage of land in a specific location, or even for cleaning up or reducing pollution in other areas. These credits may then be purchased by the member, thus further facilitating trade among participants to enable the voluntary emission reducers to achieve their desired and state pollution reduction goals.

CFI data 1536*c* include compliance CFIs that are determined by system 1500 based on computed GHG emissions and target GHG emissions.

Computation rules 1542 include rules for computing the GHG emissions, rules for computing baseline quantities of GHG emissions, rules for computing target quantities of GHG emissions, and rules for computing compliance CFIs. Usually, as further described herein, a member's GHG emissions are computed based on a product of the member's consumption data 1536*a* for each type of energy source consumed and a corresponding emissions factor. The baseline quantities and the target quantities are computed based on applying the schemes previously described herein with respect to FIGS. 1-14.

Computation parameters 1544 include emissions factors for a variety of energy sources. Generally, each emissions factor in computation parameters 1544 is associated with a type of energy source; each emissions factor is also associated with a geographic location and/or an energy provider. Emissions factors depend on the type of energy source consumed and how that energy source was generated by its provider. For example, the emissions factor for automobile travel depends on whether the fuel is gasoline, diesel, or electricity, as well as how efficiently the car uses fuel. Also, emissions factors for energy sources that are not fossil fuels (i.e., energy sources that are not, e.g., coal, gasoline, or natural gas) depend on how that energy source is generated. For example, the emissions factor for electricity produced by coal is different than the emissions factor for electricity produced by natural gas. Additionally, emissions factors for fossil fuels and non-fossil fuels depend on the technology used by the providers of the energy source (e.g., the technology used by a power plant). Since different providers of an energy source tend to use different technologies, and since different providers tend to serve different geographic locations, the emissions factor for an energy source tends to vary among providers and geographic locations. Emissions factors for countries, geographic sub-divisions therein (e.g., provinces, regions, and states), and energy providers are published by a variety of entities, such as governmental agencies (e.g., the U.S. Environmental Protection Agency (EPA)), non-governmental agencies (e.g., power plants), and intergovernmental agencies (e.g., the Intergovernmental Panel on Climate Change). For example, the U.S. EPA provides a database of emissions factors and other information for U.S. energy providers that is commonly referred to as E-GRID.

As known by those of ordinary skill in the art, the most local emissions factor for an energy source tends to be the most accurate measure of the GHG emissions that result from consumption of that energy source. Preferably, therefore, the disclosed systems and methods compute the GHG emissions that result from the consumption of an energy source based on the most local emissions factor available, in which the most local emissions factor is the emissions factor that is associated with the provider of the energy source.

As also known by those of ordinary skill in the art, the emissions factors for fossil fuels are constant, but the emissions factors for non-fossil fuels tend vary over time. As such, in some embodiments of the disclosed systems and methods, one or more of the software application programs 1508 is configured to update the emissions factors in computation parameters 1544 at time intervals based on communicating over network 1512 with one or more databases (e.g., the E-GRID database) and/or other sources of emissions factors.

In some embodiments, the disclosed systems and methods provide and/or otherwise utilize one or more of the following types of emissions factors and other factors related to consumption of energy sources: (1) for office buildings in the U.S.: (a) regional average electricity consumption factors per unit of office space (e.g., factors for one or more of the fifty U.S. states), (b) regional average natural gas consumption factors per unit of office space, and (c) regional electricity emission factors; (2) for office buildings in Canada, Mexico, and the United Kingdom: (a) national average electricity and natural gas consumption factors per unit of occupied office space, and (b) national electricity emission factors.

As previously described, consumption data can be expressed in a variety of units, including units of an energy source consumed and units of distance traveled. For example, data quantifying consumption of a transportation energy source can include gallons of fuel consumed, liters of fuel consumed, miles traveled, and kilometers traveled. As such, in some embodiments, computation parameters 1544 include emissions factors in default units (e.g., tons of $CO_2$ produced per units of energy consumed) and computation rules 1542 include one or more rules for modifying the default units so that they are compatible with the units of the consumption data (or, alternatively, one or more rules for modifying the units of the consumption data so that they are compatible with the default units), i.e., so that the units of the product of the emissions factor and the consumption data are units of GHG emissions, e.g., tons of $CO_2$ produced. For example, computation rules 1542 can include one or more rules for converting between units in a metric system and units in a non-metric system (e.g., liters to gallons), rules for converting between units within a system (e.g., kiloWatts to MegaWatts), and/or rules for converting between units of an energy source consumed and units of an activity-specific intermediate (e.g., miles traveled to gallons of gasoline consumed). The rules for converting between units of an energy source consumed and units of an activity-specific intermediate can be based on one or more efficiencies, e.g., fuel efficiencies.

FIG. 16 shows an illustrative display of a graphical user interface that facilitates computations of GHG emissions and compliance CFIs. As will be understood by those of ordinary skill in the art, the illustrative display is to be interpreted in an exemplary manner, and displays different than that shown and described herein can be used within the scope of the present disclosure. For example, features of the illustrative display can be combined, separated, interchanged, and/or rearranged to generate other displays. Also for example, displays within the scope of the present disclosure can include one or more check boxes, one or more response boxes, one or more radio buttons, one or more pull-down menus, one or more icons, and/or one or more other visual objects to facilitate computations. As will also be understood by those of ordinary skill in the art, the illustrative display can be provided by a server (e.g., a software application program 1508 residing on a server 1510) to a client (e.g., a software application program 1504 residing on a client 1506) in system 1500. The illustrative display is described in the context of interactions (e.g., requests and responses) between client 1506 and server 1510 in system 1500.

As shown in FIG. 16, the display 1600 (also referred to herein as an emissions calculator window 1600) includes an identification region 1602, a certification region 1604, a location region 1605, a consumption data region 1606, a computation region 1608, and an opt-in region 1609. The identification region 1602 includes a query box 1610 for providing a member name and a pull-down menu 1612 for selecting a compliance year, e.g., the year for which the member seeks to compute his GHG emissions and/or compliance CFIs so as to comply with regulations of the market administered by system 1500. The certification region 1604 includes a query box 1614 for providing a user signature and a timestamp 1616. The location region 1605 includes a pull-down menu for selecting the geographic location of the energy consumption. The consumption data region 1606 includes pull-down menus 1620 for selecting consumption units (labeled "reporting units" in FIG. 16) and query boxes 1622 for providing consumption data in the selected consumption units. The consumption data region 1606 also includes a pull-down menu 1620a for selecting among consumption data reporting methods for an automobile, e.g., actual fuel receipts, distance traveled and default fuel efficiency, or distance traveled and customized fuel efficiency. The computation region 1608 includes response boxes in which system 1500 provides emissions factors (labeled "conversion factor" in FIG. 16) from computation parameters 1644, computed GHG emissions (labeled "$CO_2$ emissions" in FIG. 16), compliance CFIs, and other related parameters. The opt-in region 1609 includes query boxes in which a member can provide additional data relating to GHG emissions, e.g., GHG emissions resulting from energy sources other than those shown in the consumption data region 1606. As shown in FIG. 16, the display 1600 presents a single display "screen" for calculating CO2 emissions from a range of energy sources, including, but not limited to, energy sources for offices. As will be understood by those of ordinary skill in the art, one or more features of the display 1600 can be presented on two or more display "screens."

In one illustrative operation and with reference to FIG. 15, the software application program executing within the memory 1518 of the client 1506 can detect a request 1548 to compute GHG emissions from the member 1502 by, for example, receiving an indication from the I/O subsystem 1524 that detected a mouse click, a keyboard entry, and/or another input event initiated by the user 1502. In response to the request 1548, the software application program 1504 instructs the graphics subsystem 1522 (via the processor 1514) to display the calculator window 1600. The parameters selected by and the consumption data provided by the member 1502 can be maintained in the memory 1518 of the client 1506 prior to transmission to the server 1510 via the network 1512. The software application program 1504 can apply one or more data validation rules to the parameters and/or the consumption data to reduce the occurrence of erroneous entries. One or more of these rules can be contained in memory 1518. Alternatively and/or in combination, the software application program 1504 can access one or more of these rules from the database 1534 via the network 1512.

With continuing reference to FIG. 15, the software application program 1504 can instruct the network connection process 1528 of the client 1506 to transmit the parameters and the consumption data provided by the user 1502 to a calculation process or another software process associated with the software application program 1508 executing on the server 1510 by, for example, encoding, encrypting, and/or compressing the selected request 1548 into a stream of data packets that can be transmitted between the networking subsystems 1520 of the digital data processing devices 1506, 1510. The network connection process 1530 executing on the server 1510 can receive, decompress, decrypt, and/or decode the information contained in the data packets and can store such elements in a memory accessible to the software application program 1508. The software application program 1508 can process the received data by, for example, storing the received data in computation data 1536*a*, applying one or more computation rules 1542 to the computation data 1536 so as to compute GHG emissions data 1536*b* and/or CFI data 1536*c*, and provide the computed GHG emissions data 1536 and/or computed CFI data 1536*c* to the member 1502.

FIG. 17 schematically illustrates an embodiment of a method for computing GHG emissions for a member of system 1500. As will be understood by those of ordinary skill in the art, the disclosed systems and methods are not limited to the embodiment shown in FIG. 17 and can compute GHG emissions for a member based on features that are different than and/or additional to those shown in FIG. 17.

As shown in FIG. 17, a request from a client (e.g., client 1506 in communication with member 1502) for computing GHG emissions based on consumption of energy sources is received at a server (e.g., server 1510) in system 1500 (1710 in FIG. 17). Based on receiving the request, server 1510 (e.g., a software application program 1508 residing on server 1510) provides a location feature that is related to the geographic location of energy consumption and/or the resulting GHG emissions and that is associated with location options for selection by client 1506 (1720 in FIG. 3). For example, server 1510 can provide the location feature via the location region 1605 in the calculator window 1600 of FIG. 16. The location options include geographic locations, such as countries and sub-divisions within countries (e.g., provinces, states, regions, etc.). Alternatively and/or in combination, in some embodiments, server 1510 provides a location feature that is related to the energy sources consumed and that is associated with energy source provider options for selection by client 1506. The provider options can include identifiers for energy providers, e.g., identifiers based on the E-GRID database.

With continuing reference to FIG. 17, based on receiving the request, server 1510 provides energy source features, in which each energy source feature is related to a type of energy source consumed (e.g., coal, electricity, natural gas, or vehicle fuel) and is associated with consumption units for selection by client 1506 (1730 in FIG. 3). For example, server 1510 can provide the energy source features via the consumption data region 1606 in the calculator window 1600 of FIG. 16. Generally, server 1510 provides energy source features that are related to at least two types of energy sources. The energy sources can include sources that are consumed during transportation and/or sources that are consumed independent of transportation. The consumption units can include a variety of units, such as units for an amount of an energy source consumed (e.g., Watt hours of electricity) and units for an activity-specific intermediate (e.g., kilometers traveled in a vehicle). In some embodiments, the units of the activity-specific intermediate are modified by an efficiency. For example, the units of a transportation source consumed can include an amount of the source consumed based on source purchase receipts, an amount of the source consumed based on distance traveled in a vehicle and a default fuel efficiency of the vehicle, and an mount of the source consumed based on distance traveled in a vehicle and customized fuel efficiency of the vehicle (e.g., a fuel efficiency determined and/or otherwise provided by a member).

With continuing reference to FIG. 17, server 1510 requests and/or otherwise queries client 1506 to provide consumption data for each energy source in the consumption units that were selected for that energy source (1740 in FIG. 17). For example, server 1510 can query client 1506 to provide the consumption data via the consumption data region 1606 in the calculator window 1600 of FIG. 16. The consumption data can be obtained by member 1502 and provided to client 1506 based on the schemes previously described herein with respect to FIGS. 1-14.

Subsequently, server 1510 determines an emissions factor for each energy source based on the energy source type, the selected geographic location, and the selected consumption units (1750 in FIG. 17). Generally, server 1510 makes this determination based on querying the databases 1534 (i.e., computation parameters 1544) to determine whether they include an emission factor that is associated with the energy source type and the selected location. Based on finding the emissions factor, server 1510 proceeds to compute GHG emissions (1760 in FIG. 17).

In some scenarios, the emissions factor for a combination of energy source type and selected location may not be available in databases 1534. In some embodiments, therefore, server 1510 may search for the emissions factor. For example, server 1510 may request the emissions factor from a database that is in communication with network 1512, such as a database that is maintained by a governmental agency, e.g., the E-GRID database hosted by the U.S. EPA, and/or may search one or more networks in communication with network 1512 for the emissions factor based on schemes known to those of ordinary skill in the art. Alternatively and/or in combination, in some embodiments, server 1510 queries the databases 1534 to determine whether they include an emissions factor that is associated with the energy source and a location that is less specific than the selected location (e.g., a country, instead of a geographic sub-division of a country). Based on finding such an emissions factor, server 1510 proceeds to compute GHG emissions (1760 in FIG. 17).

In some embodiments, such as the embodiment shown in FIG. 16, server 1510 provides the determined emissions factor to client 1506 via the computation region 1608 in the calculator window 1600 of FIG. 16.

As previously described, the consumption data for an energy source can be expressed in a variety of consumption units. In some embodiments, therefore, server 1510 applies one or more rules from computation rules 1542 to modify the default units of the emission factor so that they are compatible with the units of the consumption data. In some of such embodiments, such as those embodiments in which the determined emissions factor is provided to client 1506, server 1510 applies those one or more rules prior to computing the GHG emissions. Alternatively, server 1510 applies those one or more rules during computation of the GHG emissions.

With continuing reference to FIG. 17, server 1510 computes the GHG emissions for each energy source type based on the product of the consumption data and the emissions factor that correspond to that energy source type (1760 in FIG. 17). As previously described, server 1510 may apply one or more rules from computation rules 1542 to the emissions factor and/or the consumption data so that their product has units of GHG emissions, e.g., tons of $CO_2$ or another unit, such as a unit selected by and/or otherwise provided by a member. In some embodiments, server 1510 computes total GHG emissions for a member based on the sum of the GHG emissions for each energy source type consumed (1770 in FIG. 17). Additionally, server 1510 may compute the fraction of the total GHG emissions that are attributable to the consumption of each energy source type. In some embodiments, such as embodiment shown in FIG. 16, server 1510 provides the computed GHG emissions data, e.g., the GHG emissions that are computed for each energy source type and the total GHG emissions for the member, to client 1506 via computation region 1608 in calculator window 1600.

Figure 18:
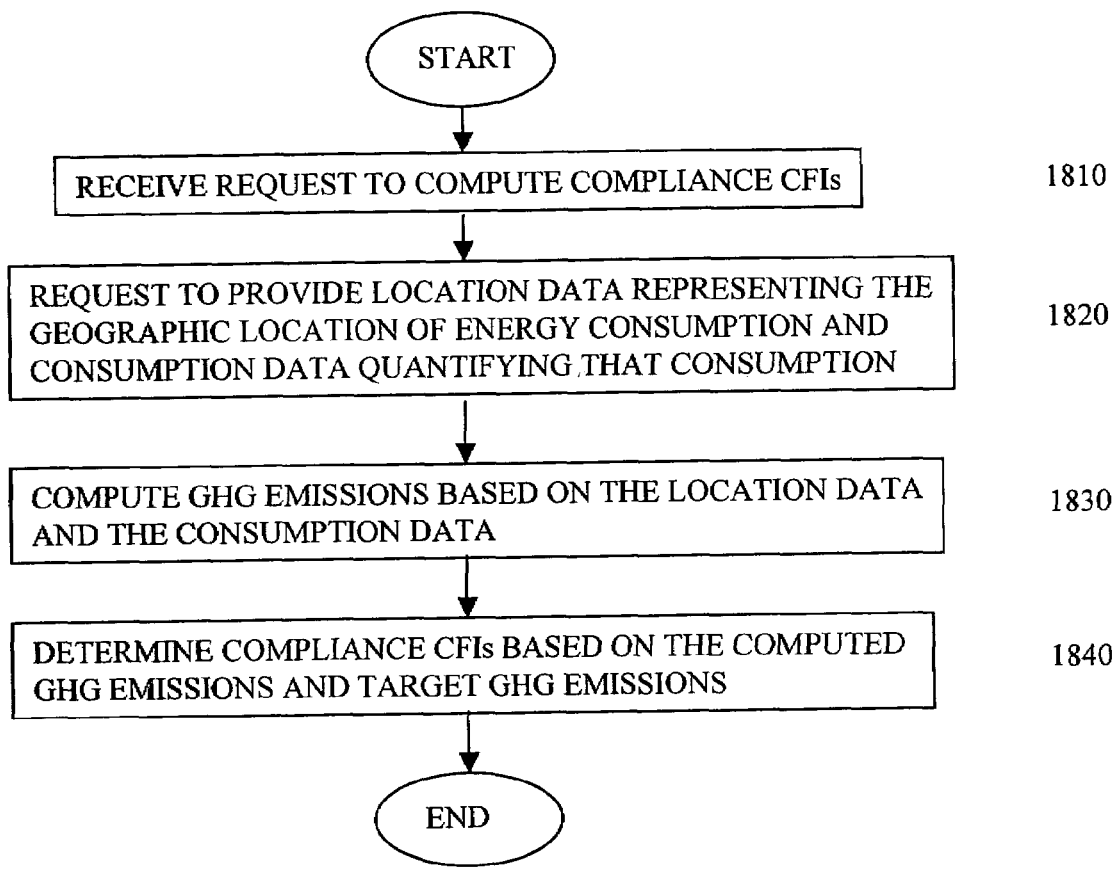
FIG. 18 schematically illustrates an embodiment of a method for computing compliance CFIs in the exemplary system of FIG. 15.

As previously described herein with respect to FIGS. 1-14, members may offset their GHG emissions by exchanging and/or retiring CFIs. (As used hereinafter, the term CFI can be understood to be a collective reference to GHG emissions offsets, including, but not limited to, the GHG emissions offsets previously described herein with respect to FIGS. 1-14.) FIG. 18 schematically illustrates an embodiment of a method for computing a quantity of compliance CFIs for a member, i.e., the quantity of CFIs that will offset the member's GHG emissions. As will be understood by those of ordinary skill in the art, the disclosed systems and methods are not limited to the embodiment shown in FIG. 18 and can compute compliance CFIs based on features that are different than and/or additional to those shown in FIG. 18.

As shown in FIG. 18, a request from a client (e.g., client 1506 in communication with member 1502) for computing compliance CFIs is received at a server (e.g., server 1510) in system 1500 (1810 in FIG. 18). Based on receiving the request, server 1510 requests and/or otherwise queries client 1506 to provide location data that represents the geographic location of the member's energy consumption and consumption data that quantifies the member's energy consumption (1820 in FIG. 18). Generally, server 1510 requests and/or otherwise queries client 1506 for the location and consumption data based on features previously described herein with respect to 1720-1740 in FIG. 17. Subsequently, server 1510 computes the resulting GHG emissions based on features previously described herein with respect to 1760-1770 in FIG. 17 (1830 in FIG. 18).

With continuing reference to FIG. 18, server 1510 determines compliance CFIs for the client based on a measure of the difference between (i) the GHG emissions computed at 1830 and (ii) target GHG emissions (1840 in FIG. 18). The measure of difference can include a difference, a difference of squares, a root mean square difference, and/or other measures of difference known to those of ordinary skill in the art. In some embodiments, such as the embodiment shown in FIG. 16, server 1510 provides the determined compliance CFIs to client 1506 via computation region 1608 in calculator window 1600.

As previously described, server 1510 determines the compliance CFIs based on computed GHG emissions and target GHG emissions for the member. In some embodiments, the target GHG emissions are determined and/or otherwise provided by client 1506 (i.e., member 1502 in communication with client 1506) to server 1510. Alternatively, in some embodiments, server 1510 computes the target GHG emissions based on the schemes previously described herein with respect to FIGS. 1-14. For example, in one such embodiment, server 1510 computes the target GHG emissions based on applying a rule (e.g., a reduction rule) to a baseline quantity of GHG emissions for the member. The baseline quantity of GHG emissions may be determined and/or otherwise provided by client 1506 to server 1510. Alternatively, server 1510 may compute the baseline quantity based on the schemes previously described herein with respect to FIGS. 1-14. For example, in one such embodiment, server 1510 computes the baseline emissions based on applying a rule (e.g., an average or a weighted average) to consumption data for a time interval.

In some embodiments, server 1510 provides a time interval feature to client 1506 at 1820 in FIG. 18. The time interval feature is related to the time interval of the member's energy consumption (e.g., a compliance year) and is associated with selectable time interval options. For example, server 1510 can provide the time interval feature via the identification region 1602 in the calculator window 1600 of FIG. 16. In one such embodiment, server 1510 provides the time interval feature so as to obtain consumption data from the client 1506 for different time intervals. Using such consumption data, server 1510 can compute GHG emissions for each of the different time intervals, a baseline quantity of GHG emissions based on those computed GHG emissions, a target quantity of GHG emissions for a later time interval, and compliance CFIs for that later time interval based on the previously described schemes.

Advantageously, the systems and methods shown and described herein with respect to FIGS. 15-18 can be used by a member to compute its GHG emissions and compliance CFIs and thereby manage its consumption of energy sources. For example, an associate member can use those embodiments to compute its direct GHG emissions (e.g., emissions that are associated with the operation of its office facility and emissions that are associated with the operation of vehicles that it owns, rents, or leases for business purposes), its indirect GHG emissions (e.g., emissions that are associated with its purchases of electricity and other non-transportation sources for business purposes and emissions that are associated with business travel (via, e.g., aircraft, urban bus, commuter rail, and intercity rail), its opt-in GHG emissions (e.g., emissions associated with its business events (such as retreats, annual meetings, and holiday parties) and emissions associated with its employees' non-business activities (such as commuting, home energy usage, travel, and materials consumption)), and its compliance CFIs for offsetting those GHG emissions.

Figure 19:
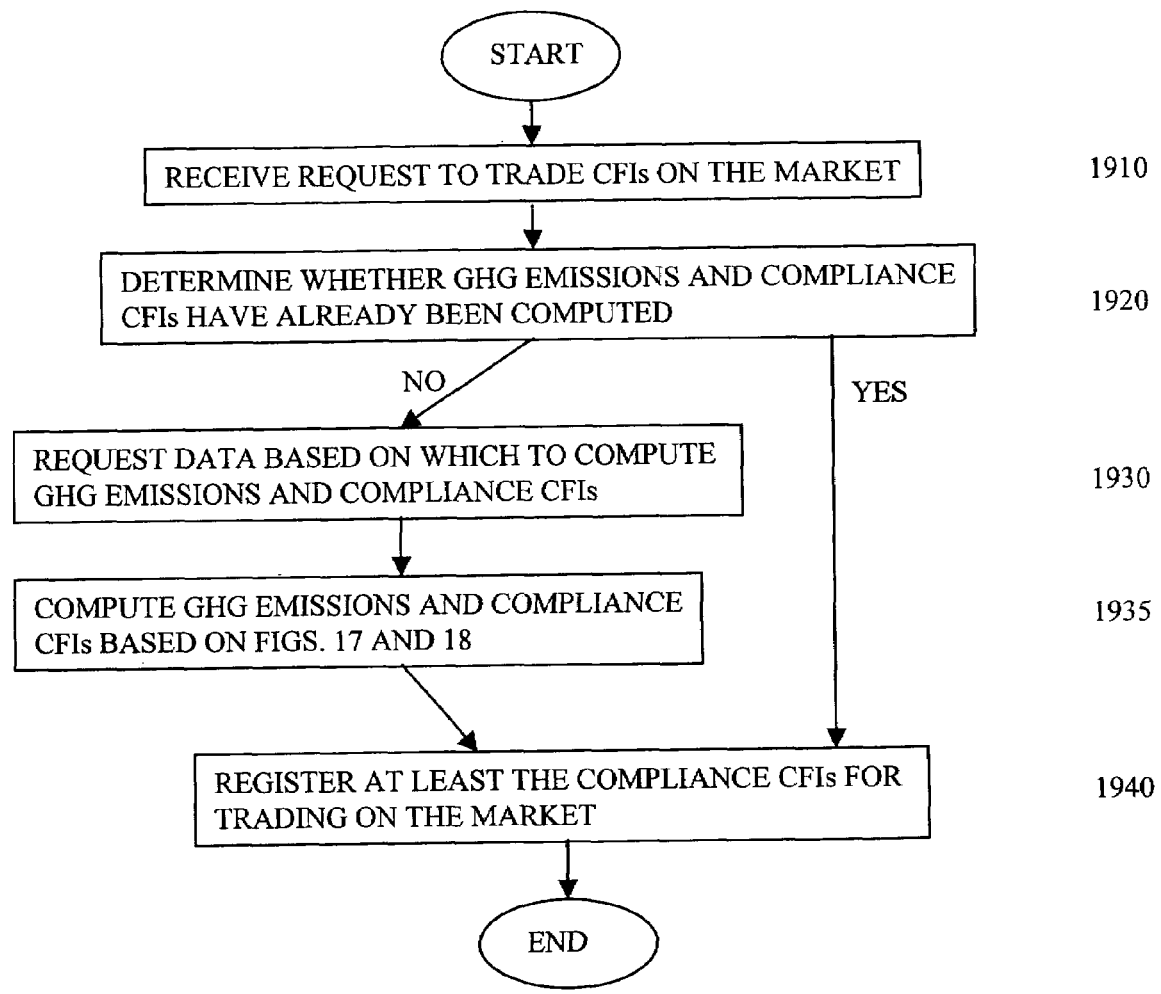
FIG. 19 schematically illustrates an embodiment of a method for registering CFIs for trading on a market supported by the exemplary system of FIG. 15.

As previously described herein with respect to FIGS. 1-14, members may trade CFIs on a market so as to reduce their GHG emissions and obtain a quantity of CFIs (and/or other related instruments) that is at least equivalent to their compliance CFIs. FIG. 19 schematically illustrates an embodiment of a method for registering a member to trade CFIs on the market. As will be understood by those of ordinary skill in the art, the disclosed systems and methods are not limited to the embodiment shown in FIG. 18 and can register a member to trade CFIs on a market based on features that are different than and/or additional to those shown in FIG. 19.

As shown in FIG. 19, a request from a client (e.g., client 1506 in communication with member 1502) for trading CFIs is received at a server (e.g., server 1510) in system 1500 (1910 in FIG. 19). Based on receiving the request, server 1510 determines whether the GHG emissions and compliance CFIs have been computed for the member based on the schemes described with respect to FIGS. 17 and 18 (1920 in FIG. 19). Generally, server 1510 makes this determination by searching databases 134 to find consumption data 1536a, GHG emissions data 1536b, and CFI data 1536c associated with the member 1502. Based on determining that the GHG emissions for the member have been computed, server 1510 registers the member to trade on the market at least the compliance CFIs that were computed at 1840 in FIG. 18 (1940 in FIG. 19).

Based on determining that the GHG emissions for the member have not been computed, server 1510 requests and/or otherwise queries client 1506 for data based on which to compute those emissions (1930 in FIG. 19). Server 1510 may request and/or otherwise query client 1506 based on the features previously described herein with respect to 1720-1740 in FIG. 17 and/or 1820 in FIG. 18. Subsequently, server 1510 computes GHG emissions and compliance CFIs for the member (1935 in FIG. 19) and proceeds to 1940 in FIG. 19.

Advantageously, the systems and methods shown and described herein with respect to FIG. 19 can be used to monitor members' GHG emissions and their compliance with market regulations. For example, a market administrator can use embodiments of the disclosed systems and methods to determine whether members are complying with their obligations to reduce GHG emissions and to inhibit rogue members for trading unregistered CFIs on the market. Moreover, requesting that members provide their consumption data to the market via signed and dated submissions (such as the submission shown in FIG. 16) can enhance the accountability of the members' conduct on the market.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted.

In some embodiments, the computer programs can be implemented in one or more spreadsheets. For example, the computer programs can be implemented in one or more spreadsheets based on Microsoft® Excel and can include one or more macros and/or other functions.

The computer programs can be stored on a storage medium or a device (e.g., compact disk (CD), digital video disk (DVD), magnetic tape or disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

Unless otherwise provided, references herein to memory can include one or more processor-readable and -accessible memory elements and/or components that can be internal to a processor-controlled device, external to a processor-controlled device, and/or can be accessed via a wired or wireless network using one or more communications protocols, and, unless otherwise provided, can be arranged to include one or more external and/or one or more internal memory devices, where such memory can be contiguous and/or partitioned based on the application.

Unless otherwise provided, references herein to a/the processor and a/the microprocessor can be understood to include one or more processors that can communicate in stand-alone and/or distributed environment(s) and can be configured to communicate via wired and/or wireless communications with one or more other processors, where such one or more processor can be configured to operate on one or more processor-controlled devices that can include similar or different devices. Use of such processor and microprocessor terminology can be understood to include a central processing unit, an arithmetic logic unit, an application-specific integrated circuit, and/or a task engine, with such examples provided for illustration and not limitation.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims.

For example, other embodiments may include different additional, or fewer market rules to facilitate the operation and acceptance of the GHG trading market Accordingly, the systems and methods described herein are not to be limited to the embodiments described herein, can include practices other than those described, and are to be interpreted as broadly as allowed under prevailing law.

The invention claimed is:

1. A computer-implemented method of promoting the reduction of emissions, comprising:

registering participants voluntarily with an established entity;

establishing an emission reduction schedule for a set future period of time, including several years, for each registered participant that produces emissions based on emissions information over previous years provided by each registered participant establishing tradable financial instruments, including emission allowances, emission offsets, and credits;

issuing tradable emission allowances to each registered participant based on the established reduction schedule;

collecting emissions data for each registered participant during each year of that future period of time;

comparing the collected emissions data with the corresponding data in the established reduction schedule for each registered participant for each year of that period of time;

based on the comparing step, determining debits or credits for each registered participant for each year of that period of time; and based on the determining step, if the registered participant's yearly emissions exceed the corresponding data in the established reduction schedule, debiting each registered participant a quantity of tradable financial instruments, thereby penalizing the registered participant, wherein the registered participant is required to purchase tradable financial instruments to achieve compliance with the reduction schedule; and based on the determining step, if the registered participant's yearly emissions are below the corresponding data in the established reduction schedule, crediting each registered participant a quantity of tradable financial instruments thereby rewarding the registered participant, wherein the registered participant can trade or bank those tradable financial instruments.

2. The method of claim 1, wherein the registered participants further comprise environmental benefactors, the registered participants that produce emissions comprise voluntary greenhouse (GHG) emission reducers and the method further comprises conducting trades over the internet between the environmental benefactors and voluntary GHG emission reducers.

3. The method of claim 2, wherein the voluntary GHG emission reducers comprise industrial entities, the environmental benefactors comprise non-industrial entities, and the voluntary GHG emission reducers obtain at least some of their tradable financial instruments from the environmental benefactors.

4. The method of claim 3, wherein the non-industrial entities comprise (a) foresters, farmers, or others who prepare land for facilitating prevention of GHG emissions or for capturing and storing carbon or carbon dioxide, or (b) businesses including law firms, advertising agencies, banks, shopping centers or other businesses that are capable of exerting control over utility or transportation uses in order to reduce or conserve such uses to reduce GHG emissions caused by generation of power or electricity for providing such uses.

5. The method of claim 3, further comprising providing credits to environmental benefactors who conduct activities that include planting trees; keeping carbon released by plants in the soil; reducing electricity consumption; reducing business travel; removing pollutants from streams, lakes, landfills, or other environmentally unfriendly areas; purchasing environmentally friendly products; or recycling, thus facilitating trading of tradeable financial instruments by the environmental benefactors with the voluntary GHG emission reducers.

6. The method of claim 1, further comprising computing tradable carbon financial instruments for the registered participants based on an energy consumption or conservation activity.

7. The method of claim 6, wherein the energy consumption or conservation source activities include at least one of: power generation activities, transportation activities, and non-transportation activities, in which each transportation activity is related to an energy source consumed during transportation and is associated with selectable activity units that include one or more of: units of transportation fuel consumed during transportation and units of distance traveled during transportation, optionally modified by fuel efficiency values, and in which each non-transportation energy activity is related to an energy source consumed independent of transportation and is associated with selectable activity units that include one or more of: units of energy consumed during production of a product, units of a feedstock consumed during production of a product, units of a product produced, units of a product consumed, units of energy consumed during operation of an office facility, and units of office space occupied by an office facility.

8. The method of claim 1, wherein the establishment of the emission reduction schedule comprises creating an emission reduction baseline based on actual emissions and obtaining the registered participants' agreement to meet the reduction schedule by obtaining tradable financial instruments.

9. The method of claim 8, further comprising adjusting the baseline due to changing emission factors.

10. The method of claim 1, wherein the determination of debits or credits comprises consideration of the registered participant's use of alternative energy sources.

11. The method of claim 1, wherein the determination of debits or credits comprises consideration of the registered participant's activities prior to its registration with the established entity.

12. The method of claim 11, wherein the activities comprise one or more of reforestation, assisted forest regeneration, avoided deforestation, fuel switching, landfill methane destruction, and renewable energy generation from solar, wind, small hydroelectric and biomass systems.

13. The method of claim 1, further comprising establishing emission monitoring rules that designate which activities count toward emissions.

14. The method of claim 1, further comprising independently verifying that the registered participants are properly providing the emissions data to achieve emission reductions according to the established reduction schedule.

15. The method of claim 1, wherein participation by the registered participants is across multiple countries and trading is conducted over the internet.

16. The method of claim 1, wherein the emission reduction schedule is established for a future period of four years and is based on emission information for the prior four years.

17. A computer-implemented system for promoting the reduction of emissions, comprising:
    a processor, wherein the processor is configured to:
    register participants voluntarily with an established entity;
    establish an emission reduction schedule for a set future period of time, including several years, for each registered participant that produces emissions based on emissions information over previous years provided by each registered participant;
    establish tradable financial instruments, including emission allowances, emission offsets, and credits;
    issue tradable emission allowances to each registered participant based on the established reduction schedule;
    collect emissions data for each registered participant during each year of that future period of time;
    compare the collected emissions data with the corresponding data in the established reduction schedule for each year of that period of time;
    based on the comparison, determine debits or credits for each registered participant for each year of that period of time; and based on the determination, if the registered participant's yearly emissions exceed the corresponding data in the established reduction schedule, debit each registered participant a quantity of tradable financial instruments, thereby penalizing the registered participant, wherein the registered participant is required to purchase tradable financial instruments to achieve compliance with the established reduction schedule; and based on the determination, if the registered participant's yearly emissions are below the corresponding data in the established reduction schedule, credit each registered participant a quantity of tradable financial instruments, thereby rewarding the registered participant, wherein the registered participant can trade or bank those tradable financial instruments.

18. The system of claim 17, wherein the registered participants comprise environmental benefactors, the registered participants that produce emissions comprise voluntary GHG emission reducers, the tradable financial instruments represent emission reduction amounts based on the emissions information or activities of the environmental benefactors, and the processor is further configured to conduct trades of the tradable financial instruments between the environmental benefactors and the voluntary GHG reducers to enable each registered participant that produces emissions to achieve its reduction schedule.

19. The system of claim 17, wherein the processor is further configured to provide registered participants with tradable early action credits or renewable energy certificates to provide for long term planning to achieve emission reductions according to the established reduction schedule, and is configured to conduct trades of such credits or certificates over the internet.

20. The system of claim 17, wherein the emission reduction schedule is established for a future period of four years and is based on emissions information for the prior four years.

* * * * *

UNITED STATES PATENT AND TRADEMARK OFFICE
CERTIFICATE OF CORRECTION

PATENT NO.         : 7,343,341 B2                                      Page 1 of 1
APPLICATION NO.    : 11/034752
DATED              : March 11, 2008
INVENTOR(S)        : Sandor et al.

It is certified that error appears in the above-identified patent and that said Letters Patent is hereby corrected as shown below:

<u>Column 10</u>:
Line 14, change "CEIs" to -- CFIs --.

<u>Column 42</u>:
Line 63 (claim 1, line 9) after "participant" insert -- ; --.

Signed and Sealed this

Seventeenth Day of June, 2008

JON W. DUDAS
*Director of the United States Patent and Trademark Office*